United States Patent
Dvir et al.

(10) Patent No.: US 10,951,920 B2
(45) Date of Patent: Mar. 16, 2021

(54) IMAGE AND VIDEO PROCESSING APPARATUSES AND METHODS

(71) Applicant: Huawei Technologies Co., Ltd., Shenzhen (CN)

(72) Inventors: Itsik Dvir, Munich (DE); Natan Peterfreund, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 61 days.

(21) Appl. No.: 16/429,891

(22) Filed: Jun. 3, 2019

(65) Prior Publication Data

US 2019/0289303 A1    Sep. 19, 2019

Related U.S. Application Data

(63) Continuation of application No. PCT/EP2017/052204, filed on Feb. 2, 2017.

(51) Int. Cl.
*H04N 19/60*    (2014.01)
*H04N 19/182*   (2014.01)
(Continued)

(52) U.S. Cl.
CPC .......... *H04N 19/649* (2014.11); *G06F 17/13* (2013.01); *G06F 17/14* (2013.01); *G06F 17/147* (2013.01);
(Continued)

(58) Field of Classification Search
CPC ...... H04N 19/649; H04N 19/20; H04N 19/90; H04N 19/182; H04N 19/45; G06F 17/14; G06F 17/13; G06F 17/147
See application file for complete search history.

(56) References Cited

U.S. PATENT DOCUMENTS

| | | | |
|---|---|---|---|
| 6,718,066 B1 * | 4/2004 | Shen | H04N 19/61 375/E7.076 |
| 2013/0101039 A1 | 4/2013 | Florencio | |
| 2018/0278957 A1 * | 9/2018 | Fracastoro | G06T 7/11 |

FOREIGN PATENT DOCUMENTS

| | | |
|---|---|---|
| CN | 104702962 A | 6/2015 |
| EP | 0649258 B1 | 9/1999 |

(Continued)

OTHER PUBLICATIONS

Proskurowski, "A Package for the Helmholtz Equation in Nonrectangular Planar Regions," ACM Transactions on Mathematical Software, vol. 9, No. 1, Mar. 1983.*

(Continued)

*Primary Examiner* — Michael J Hess
(74) *Attorney, Agent, or Firm* — Leydig, Voit & Mayer, Ltd.

(57) ABSTRACT

The disclosure relates to an image processing apparatus for compressing or decompressing a segment of an image, the segment being non-rectangular and comprising a plurality of pixels, each pixel comprising a pixel value, the pixel values of the plurality of pixels forming a pixel value vector, the apparatus comprising: a processor configured to compress the segment or configured to decompress the segment, wherein compressing the segment comprises computing a plurality of expansion coefficients by expanding the pixel value vector into a plurality of basis vectors, wherein the basis vectors are discrete approximations of solutions of a boundary value problem of the Helmholtz equation on the segment of the image; and wherein decompressing the segment comprises computing the pixel value vector by forming a linear combination of the basis vectors according to the plurality of expansion coefficients.

20 Claims, 31 Drawing Sheets

300

301
Compressing or decompressing a segment of an image, wherein compressing the segment comprises computing a plurality of expansion coefficients by expanding a pixel value vector into a plurality of basis vectors, wherein the basis vectors are discrete approximations of solutions of a boundary value problem of the Helmholtz equation on the segment of the image, and wherein decompressing the segment comprises computing the pixel value vector by forming a linear combination of the basis vectors according to the plurality of expansion coefficients

(51) Int. Cl.
*H04N 19/44* (2014.01)
*H04N 19/20* (2014.01)
*G06F 17/14* (2006.01)
*G06F 17/13* (2006.01)
*H04N 19/90* (2014.01)

(52) U.S. Cl.
CPC ............ *H04N 19/182* (2014.11); *H04N 19/20* (2014.11); *H04N 19/45* (2014.11); *H04N 19/90* (2014.11)

(56) References Cited

FOREIGN PATENT DOCUMENTS

| WO | 2016074744 A1 | 5/2016 |
|----|---------------|--------|
| WO | 2016074745 A1 | 5/2016 |
| WO | 2016074746 A1 | 5/2016 |

OTHER PUBLICATIONS

Mukherjee et al., "Tracking Multiple Circular Objects in Video Using Helmholtz Principle," 2009.*

Sullivan et al., "Overview of the High Efficiency Video Coding (HEVC) Standard," IEEE Transactions on Circuits and Systems for Video Technology, vol. 22, No. 12, pp. 1649-1668, Institute of Electrical and Electronics Engineers, New York, New York (Dec. 2012).

Gilge et al., "Region-Oriented Transform of Images Coding (ROTC)," Institute of Electrical and Electronics Engineers, New York, New York, pp. 2245-2248 (1990).

Ding et al., "Two-Dimensional Orthogonal DCT Expansion in Trapezoid and Triangular Blocks and Modified JPEG Image Compression," IEEE Transactions on Image Processing, vol. 22, No. 9, pp. 3664-3657, Institute of Electrical and Electronics Engineers, New York, New York (Sep. 2013).

McCartin, "On Polygonal Domains with Trigonometric Eigenfunctions of the Laplacian under Dirichlet or Neumann Boundary Conditions," Applied Mathematical Sciences, vol. 2, No. 58, pp. 2891-2901 (2008).

McCartin, "Eigenstructure of the Discrete Laplacian on the Equilateral Triangle: The Dirichlet and Neumann Problems," Applied Mathematical Sciences, vol. 4, No. 53, pp. 2633-2646 (2010).

Strang, "The Discrete Cosine Transform," SIAM Review vol. 41, No. 1, pp. 135-147, Society for Industrial and Applied Mathematics (1999).

Ahmed, et al., "Discrete Cosine Transform," IEEE Transactions on Computers, pp. 90-93, Institute of Electrical and Electronics Engineers, New York, New York (1974).

Strauss, "Partial Differential Equations—An Introduction," John Wiley and Sons, pp. 1-466 (2007).

Sikora et al., "Shape-Adaptive DCT for Generic Coding of Video," IEEE Transactions on Circuits and Systems for Video Technology, vol. 5, No. 1, pp. 59-62, Institute of Electrical and Electronics Engineers, New York, New York (Feb. 1995).

"Series H: Audiovisual and Multimedia Systems, Infrastructure of audiovisual services—Coding of moving video, High efficiency video coding," ITU-T H.265, pp. 1-664, International Union of Telecommunication, Geneva, Switzerland (Dec. 2016).

Kaup, "Adaptive Low-Pass Extrapolation for Object-Based Texture Coding of Moving Video," Proceedings of SPIE—The International Society for Optical Engineering vol. 3024, XP1130815 pp. 731-741 (1997).

Apostolopoulos et al., "Representing Arbitrarily-Shaped Regions: A Case Study of Overcomplete Representations," IEEE, XP10197116, pp. 426-429, Institute of Electrical and Electronics Engineers, New York, New York (1995).

Gilge et al., "Coding of Arbitrarily Shaped Image Segments Based on a Generalized Orthogonal Transform," Signal Processing: Image Communication, vol. 1, XP24241729, pp. 153-180, Elsevier Science Publishers B.V. (1989).

Stiller et al., "Eigentransforms for Region-Based Image Processing," IEEE, XP547824, pp. 286-287, Institute of Electrical and Electronics Engineers, New York, New York (1995).

Chang et al., "Transform Coding of Arbitrarily-Shaped Image Segments," ACM Multimedia, XP58296349, pp. 1-8 (1993).

Lin et al.,"Removal of the decoder-side DBBP partition derivation process," Joint Collaborative Team on 3D Video Coding Extensions of ITU-T SG 16 WP 3 and ISO/IEC JTC 1/SC 29/WG 11, 9th Meeting: Sapporo, JP, Document: JCT3V-I0097, total 7 pages (Jul. 3-9, 2014).

* cited by examiner

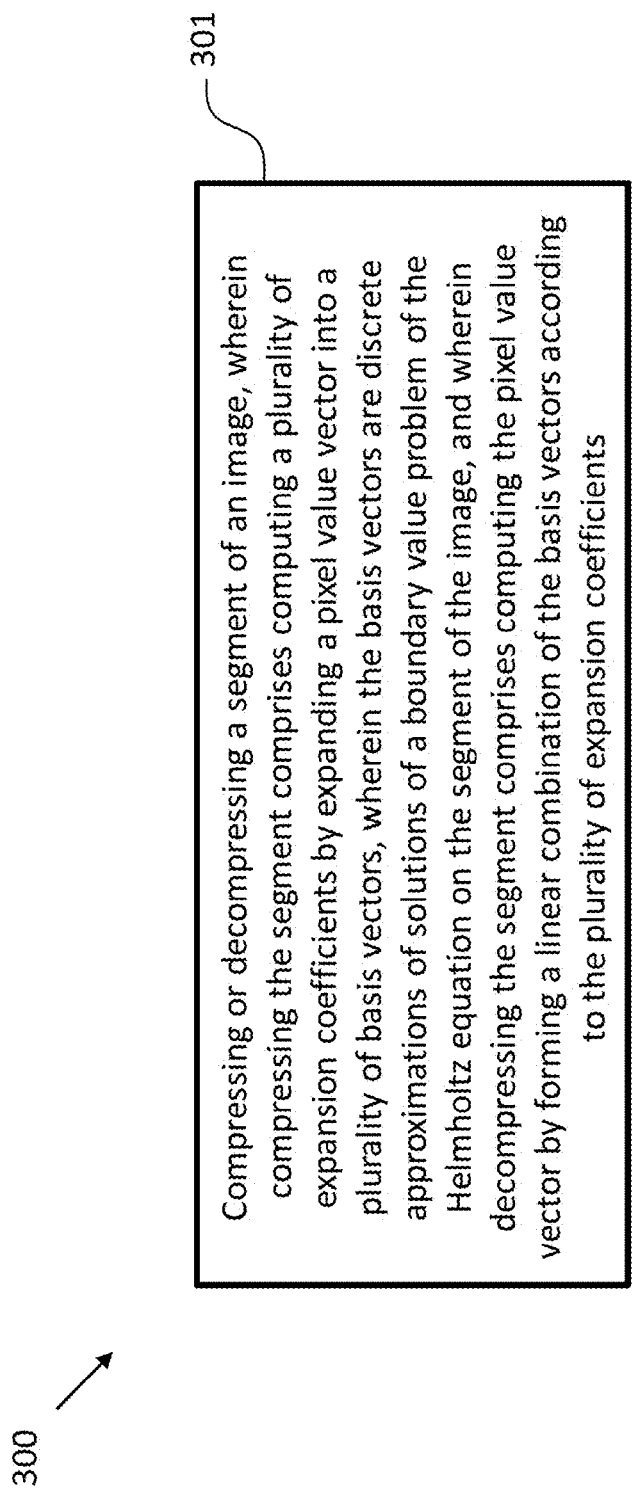

Compressing or decompressing a segment of an image, wherein compressing the segment comprises computing a plurality of expansion coefficients by expanding a pixel value vector into a plurality of basis vectors, wherein the basis vectors are discrete approximations of solutions of a boundary value problem of the Helmholtz equation on the segment of the image, and wherein decompressing the segment comprises computing the pixel value vector by forming a linear combination of the basis vectors according to the plurality of expansion coefficients

IMAGE AND VIDEO PROCESSING APPARATUSES AND METHODS

CROSS-REFERENCE TO RELATED APPLICATIONS

This application is a continuation of International Application No. PCT/EP2017/052204, filed on Feb. 2, 2017, the disclosure of which is hereby incorporated by reference in its entirety.

TECHNICAL FIELD

The present disclosure relates to image and video coding. More specifically, the disclosure relates to image coding apparatuses, video coding apparatuses as well as corresponding methods.

BACKGROUND

The two-dimensional discrete cosine transform (herein also referred to as 2D-DCT or simply DCT) is the most widely used unitary transform for image and video coding applications. The 2D-DCT is based on an orthogonal, complete and separable basis set of cosine functions, and is used to represent the image information of a rectangular image or image block by spatial frequency coefficients. Generally, the energy of smooth signals is concentrated in the low frequency DCT coefficients. Continuity at the interval boundaries has made DCT-II more attractive and the most preferred transform in image and video coding standards. For practical purposes DCT coefficients are computed by fast and efficient algorithm schemes.

Occasionally, a rectangular bock contains image content parts of arbitrary shapes or polygons. However, when 2D-DCT (or variants thereof, such as 2D-DST, i.e. the two-dimensional discrete sine transform) is used to represent such arbitrary shapes within a rectangular image block, discontinuities and inhomogeneity in the image content increase the number of non-zero coefficients of high frequencies as a result of the Gibbs phenomenon at the boundary edges. In the state-of the-art standard HEVC smaller rectangular blocks are recursively applied to such non-rectangular blocks using quad-tree partitioning. However, the representation for such rectangular blocks may not be efficient.

Therefore, there is a need for improved image and video processing apparatuses and methods allowing, in particular, for a more efficient encoding and decoding of images or image blocks having a non-rectangular shape, such as images or image blocks having a polygonal shape.

SUMMARY

It is an object of the disclosure to provide improved image and video processing apparatuses and methods that allow, in particular, for a more efficient encoding and decoding of images or image blocks having a non-rectangular shape, such as images or image blocks having a polygonal shape.

The foregoing and other objects are achieved by the subject matter of the independent claims. Further implementation forms are apparent from the dependent claims, the description and the figures.

As used herein, an image or image signal comprises a plurality of pixels, wherein each pixel is associated with at least one pixel value.

As used herein, a video signal or video sequence is a set of subsequent frames presenting a motion picture. In other words, a video signal or video sequence consists of a plurality of images (also referred to as pictures or frames).

As used herein, segmentation is the process of partitioning an image or image region, in particular a video coding block, into two or more image segments or partitions.

As used herein, coding tree unit (CTU) denotes the root of a coding structure of the video sequence of a pre-defined size, containing a part of an image (e.g. 64×64 pixels). A CTU can be partitioned into several CUs.

As used herein, coding unit (CU) denotes a basic coding structure of the video sequence of a pre-defined size, containing a part of an image, which is belonging to a CTU. A CU can be partitioned into further CUs.

The devices and method described herein may be used for representing motion information for segmentation based block partitioning, used in conjunction with rectangular block partitioning, which is useful for inter-prediction in video coding applications.

The devices and methods described herein may be used for inter-prediction between images to exploit the temporal redundancy of video sequences. The change of information observed between the current image and a reference image can often be approximated by translational movement, e.g. linear movement within the image plane. Block based motion compensation is the dominating realisation of this paradigm, where a reference image is partitioned into rectangular blocks and each pixel within a block is exhibiting the same motion. Thus, the movement of the entire block, called the prediction block, can be described by a single motion vector.

According to a first aspect the disclosure relates to an image processing apparatus for compressing or decompressing a segment of an image, the segment being non-rectangular and comprising a plurality of pixels, each pixel comprising a pixel value, the pixel values of the plurality of pixels forming a pixel value vector, the apparatus comprising: a processor configured to compress the segment or configured to decompress the segment, wherein compressing the segment comprises computing a plurality of expansion coefficients by expanding the pixel value vector into a plurality of basis vectors, wherein the basis vectors are discrete approximations of solutions of a boundary value problem of the Helmholtz equation on the segment of the image, and wherein decompressing the segment comprises computing the pixel value vector by forming a linear combination of the basis vectors according to the plurality of expansion coefficients.

Thus, an improved image processing apparatus is provided allowing, in particular, for a more efficient encoding and decoding of images or image segments having a non-rectangular shape, such as images or image segments having a polygonal shape due to a more efficient representation in the spectral domain.

The discrete approximations of the solutions of the boundary value problem of the Helmholtz equation on the segment of the image may retain most of the image segment information by fewer expansion coefficients than there are pixels, leading to small expansion error, thereby achieving a compressions effect. In an implementation form, the processor is configured to process a separate pixel value vector for each color component of the image.

In a first possible implementation form of the image processing apparatus according to the first aspect as such, the processor is configured to represent a discretized Laplace operator of the Helmholtz equation as a system matrix A and to determine the basis vectors as eigenvectors of the system matrix A.

In a second possible implementation form of the image processing apparatus according to the first implementation form of the first aspect, the processor is configured to generate the system matrix A on the basis of the shape of the segment.

In a third possible implementation form of the image processing apparatus according to the first or second implementation form of the first aspect, the processor is configured to generate the system matrix A on the basis of a plurality of boundary conditions defined for a boundary of the image segment. The boundary of the segment may consist of a plurality of boundary pixels. Depending on the details of the implementation, each boundary pixel may be either an edge pixel of the segment or a pixel adjoining the segment. In other words, the boundary pixels may comprise edge pixels of the segment and/or pixels adjoining the segment. The pixels adjoining the segment may be actual or virtual (i.e. fictitious) pixels of the image.

In a fourth possible implementation form of the image processing apparatus according to any one of the first to third implementation form of the first aspect, the processor is configured to define the discretized Laplace operator as a five-point stencil or a nine-point stencil.

In a fifth possible implementation form of the image processing apparatus according to any one of the first to fourth implementation form of the first aspect, the processor is configured to generate the system matrix A by scanning the plurality of pixels of the image segment on the basis of a scanning order to define an order of the plurality of domain pixels of the segment and to determine the number of the plurality of domain pixels of the segment, wherein the number of the plurality of domain pixels of the segment defines the size K×K of the system matrix A. Scanning the plurality of pixels does not necessarily include scanning the boundary pixels of the segment; in certain embodiments the boundary pixels may be discarded from the scanning.

In a sixth possible implementation form of the image processing apparatus according to the fifth implementation form of the first aspect, the processor is configured to generate the i-th column of the system matrix A, with $1 \leq i \leq K$, by centering the discretized Laplace operator, in particular the five-point stencil or the nine-point stencil, on the i-th pixel of the plurality of domain pixels as defined by the scanning order.

In a seventh possible implementation form of the image processing apparatus according to the sixth implementation form of the first aspect, the processor is configured to define the i-th column of the system matrix A, with $1 \leq i \leq K$, on the basis of the plurality of boundary conditions, wherein the plurality of boundary conditions comprise Dirichlet boundary conditions, Neumann boundary conditions and/or mixed boundary conditions. In an implementation form, these boundary conditions can be defined for respective center points or respective mid points of a grid for discretizing the positions of the plurality of pixels of the image segment.

In an eight possible implementation form of the image processing apparatus according to any one of the first to seventh implementation form of the first aspect, the processor is further configured to determine the eigenvalues of the system matrix A and to arrange the eigenvectors of the system matrix A in an increasing order of the eigenvalues. This arrangement of the eigenvectors of the system matrix A in increasing order can be used for defining the actual transformation matrix V.

According to a second aspect the disclosure relates to an image processing method for compressing or decompressing a segment of an image, the segment being non-rectangular and comprising a plurality of pixels, each pixel comprising a pixel value, the pixel values of the plurality of pixels forming a pixel value vector, the method comprising:

compressing or decompressing the segment of the image, wherein compressing the segment comprises computing a plurality of expansion coefficients by expanding the pixel value vector into a plurality of basis vectors, wherein the basis vectors are discrete approximations of solutions of a boundary value problem of the Helmholtz equation on the segment of the image, and wherein decompressing the segment comprises computing the pixel value vector by forming a linear combination of the basis vectors according to the plurality of expansion coefficients.

Thus, an improved image processing method is provided allowing, in particular, for a more efficient encoding and decoding of images or image segments having a non-rectangular shape, such as images or image segments having a polygonal shape due to a more efficient representation in the spectral domain.

The image processing method according to the second aspect of the disclosure can be performed by the image processing apparatus according to the first aspect of the disclosure. Further features of the method according to the second aspect of the disclosure result directly from the functionality of the apparatus according to the first aspect of the disclosure and its different implementation forms.

According to a third aspect the disclosure relates to a video coding apparatus for encoding or decoding a video signal, wherein the video coding apparatus comprises an image processing apparatus according to the first aspect of the disclosure, wherein the video coding apparatus is configured during encoding for compressing a non-rectangular segment of a residual image generated from the video signal or configured during decoding for decompressing a non-rectangular segment of a residual image generated from the video signal. In an implementation form the video coding apparatus is further configured to determine the non-rectangular segment of the residual image, for instance, on the basis of intra- or inter-prediction.

Thus, an improved video coding apparatus is provided allowing, in particular, for a more efficient encoding and decoding of images or image segments having a non-rectangular shape, such as images or image segments having a polygonal shape due to a more efficient representation in the spectral domain.

In a first possible implementation form of the video coding apparatus according to the third aspect as such, the eigenvectors of the system matrix A define a transformation matrix V, wherein for encoding or decoding the video signal the processor is configured to scan the column vectors of the transformation matrix V according to an increasing order of eigenvalues associated with the eigenvectors of the system matrix A.

In a second possible implementation form of the video coding apparatus according to the third aspect as such or the first implementation form thereof, the processor is further configured to determine the orthogonal set of transforms on the basis of a rate distortion criterion.

In a third possible implementation form of the video coding apparatus according to the third aspect as such or the first or second implementation form thereof, the processor is further configured to determine the plurality of boundary conditions for the plurality of boundary pixels of the segment on the basis of another image segment of the same image or a different image of the video signal.

According to a fourth aspect the disclosure relates to a computer program comprising program code for performing the image processing method according to the second aspect or when executed on a computer.

The disclosure can be implemented in hardware and/or software.

BRIEF DESCRIPTION OF THE DRAWINGS

Further embodiments of the disclosure will be described with respect to the following figures, wherein:

FIG. 3 shows a schematic diagram illustrating an image processing method according to an embodiment;

FIG. 8 shows a system matrix A for the exemplary square-shaped image segment of FIG. 7;

FIG. 9a shows the respective system matrix A for the exemplary L-shaped image segment of FIG. 15 for Dirichlet boundary conditions using a 5-point stencil and a 9-point stencil approximation, respectively;

FIG. 9b shows the respective system matrix A for the exemplary L-shaped image segment of FIG. 4 for Neumann boundary conditions using a 5-point stencil and a 9-point stencil approximation, respectively;

In the various figures, identical reference signs will be used for identical or functionally equivalent features.

DETAILED DESCRIPTION OF EMBODIMENTS

In the following description, reference is made to the accompanying drawings, which form part of the disclosure, and in which are shown, by way of illustration, specific aspects in which the present disclosure may be placed. It is understood that other aspects may be utilized and structural or logical changes may be made without departing from the scope of the present disclosure. The following detailed description, therefore, is not to be taken in a limiting sense, as the scope of the present disclosure is defined be the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
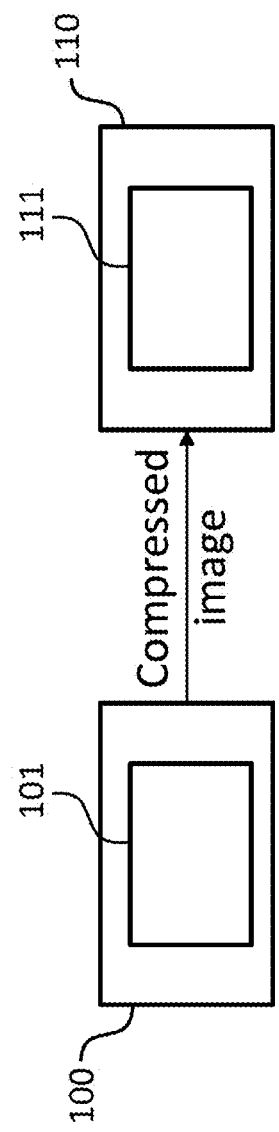
FIG. 1 shows a schematic diagram illustrating an image processing apparatus for compressing an image according to an embodiment and an image processing apparatus for decompressing an image according to an embodiment.

FIG. 1 shows a schematic diagram illustrating an image processing apparatus 100 according to an embodiment and an image processing apparatus 110 according to an embodiment. The image processing apparatus 100 comprises a processor 101 and the image processing apparatus 110 comprises a processor 111.

The image processing apparatus 100 is configured to compress a segment of an image, wherein the segment is non-rectangular and comprises a plurality of pixels. Each pixel comprises a pixel value and the pixel values of the plurality of pixels form a pixel value vector, as will be described in more detail further below. The processor 101 of the apparatus 100 is configured to compress the image segment, including computing a plurality of expansion coefficients by expanding the pixel value vector into a plurality of basis vectors, wherein the basis vectors are discrete approximations of solutions of a boundary value problem of the Helmholtz equation on the segment of the image.

The image processing apparatus 110 is configured to decompress a segment of an image, wherein the segment is non-rectangular and comprises a plurality of pixels. Each pixel comprises a pixel value and the pixel values of the plurality of pixels form a pixel value vector, as will be described in more detail further below. The processor 111 of the apparatus 110 is configured to decompress the image segment, including computing the pixel value vector by forming a linear combination of the basis vectors according to the plurality of expansion coefficients. As shown in FIG. 1, the image processing apparatus 110 is configured to decompress a compressed image provided by the image processing apparatus 100.

Figure 2:
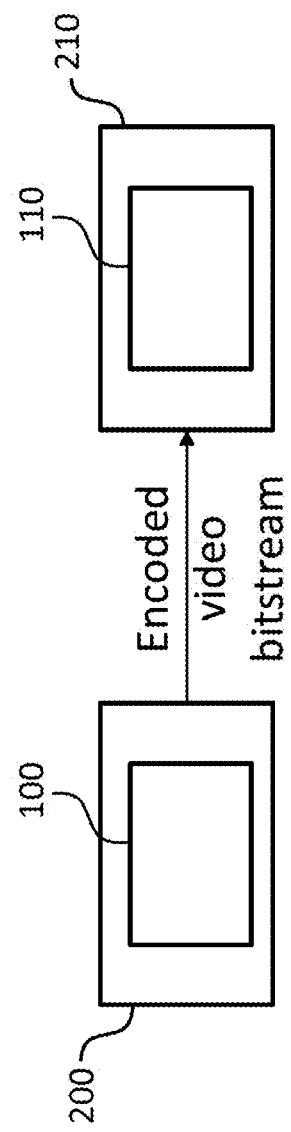
FIG. 2 shows a schematic diagram illustrating a video coding apparatus for encoding a video signal according to an embodiment and a video coding apparatus for decoding a video signal according to an embodiment.

FIG. 2 shows a schematic diagram illustrating a video coding apparatus 200 for encoding a video signal according to an embodiment and a video coding apparatus 210 for decoding a video signal according to an embodiment.

The video coding apparatus 200 comprises the image processing apparatus 100 of FIG. 1 and is configured to compress a non-rectangular segment of a residual image generated from the video signal.

The video coding apparatus 210 comprises the image processing apparatus 110 of FIG. 1 and is configured to decompress a non-rectangular segment of a residual image generated from the encoded video signal. As shown in FIG. 2, the video coding apparatus 201 is configured to decompress a non-rectangular image segment of a residual image generated from an encoded video bitstream provided by the video coding apparatus 200.

FIG. 3 shows a schematic diagram illustrating an image processing method 300 according to an embodiment. The image processing method 300 is configured for compressing or decompressing a segment of an image, wherein the segment is non-rectangular and comprises a plurality of pixels. Each pixel comprises a pixel value, wherein the pixel values of the plurality of pixels form a pixel value vector. The image processing method 300 comprises a step 301 of compressing or decompressing the segment of the image, wherein compressing the segment comprises computing a plurality of expansion coefficients by expanding the pixel value vector into a plurality of basis vectors, wherein the basis vectors are discrete approximations of solutions of a boundary value problem of the Helmholtz equation on the segment of the image, and wherein decompressing the segment comprises computing the pixel value vector by forming a linear combination of the basis vectors according to the plurality of expansion coefficients.

Before describing further embodiments of the image processing apparatus 100, 110 of FIG. 1, the video coding apparatus 200, 210 of FIG. 2 and the image processing method of FIG. 3 in more detail, some mathematical background will be introduced.

The spectrum of the continuous Laplace Operator $$\Delta f = \frac{\partial^2 f}{\partial x^2} + \frac{\partial^2 f}{\partial y^2}$$

consists of all eigenvalues $\lambda$ for which there is a corresponding eigenfunction $f(x,y)$, subject to certain boundary conditions (BC). The BC may, for example, be Dirichlet boundary conditions $-\Delta f = \lambda f$, $f=0$ on the boundary of $\Omega$ or Neumann boundary conditions $-\Delta f = \lambda f$, $\partial f/\partial n=0$ on the boundary of $\Omega$, where $\Omega$ denotes an arbitrary bounded domain in $R^2$ (i.e. the Cartesian plane) that has a piecewise smooth boundary, x and y denote the standard Cartesian coordinates, and n denotes the normal to the boundary of $\Omega$.

The eigenfunctions $f(x,y)$ and eigenvalues $\lambda$ depend on the boundary conditions. The eigenvalues, in ascending order, repeating each one according to its multiplicity, are all positive for Dirichlet boundary conditions, i.e. $0 < \lambda_1 \leq \lambda_2 \leq \lambda_3 \leq \ldots \leq \lambda_n \leq \ldots$, and non-negative for Neumann boundary conditions, i.e. $0 = \hat{\lambda}_1 < \hat{\lambda}_2 \leq \hat{\lambda}_3 \leq \ldots \leq \hat{\lambda}_n \leq \ldots$. As will be described in more detail below, each combination of image segment shape and boundary conditions generally has its own particular sequence of eigenvalues. As will be appreciated, the eigenvalues can be considered to be minima of the potential energy, i.e., the eigenvalues minimize the energy subject to certain constraints.

The eigenfunctions of the Laplacian for the Dirichlet boundary conditions are a complete basis set for $L^2(\Omega)$. The same is true for Neumann boundary conditions. This property is also referred to as completeness.

Complete sets of trigonometric eigenfunctions are known analytically only for some planar shapes in the continuous case. The set of planar shapes that have a complete set of trigonometric eigenfunctions includes the following planar shapes: rectangular, including the special case of the square; iso-scales right angle triangle; equilateral triangle; and the 30-60-90 degrees "hemi-equilateral" triangle.

In embodiments of the disclosure, the continuous Laplacian eigenproblem $\Delta f = -\lambda f$ (already mentioned above), is discretized and expressed as an eigenvector-eigenvalue problem $Av = \lambda v$, where, A is a system matrix, which is determined by the discretization of the image segment (herein also referred to as domain), the boundary conditions and the representation of the Laplacian operator. In an embodiment, the eigenvectors are the columns of the transformation matrix V in an increasing order of the eigenvalues.

In an embodiment, the uniform Cartesian grid is used for sampling the continuous domain of an image segment.

Given an image segment (or image domain) D defined by an indication matrix defined as follows:

$$In(x, y) = \begin{cases} 1 & \text{If pixel}(x, y) \in D \\ 0 & \text{otherwise} \end{cases} \quad (9)$$

each pixel in the image segment D (referred to herein as a domain pixel) has at least one 8-points-neighborhood pixel which is in D. When an image segment is defined as a polygon or by a continuous closed curve, a grid covering D and approximating D by a union of squares can be used. In an embodiment, each square has a size of a full pixel. As will be appreciated, a connected segment may contain holes.

Figure 4:
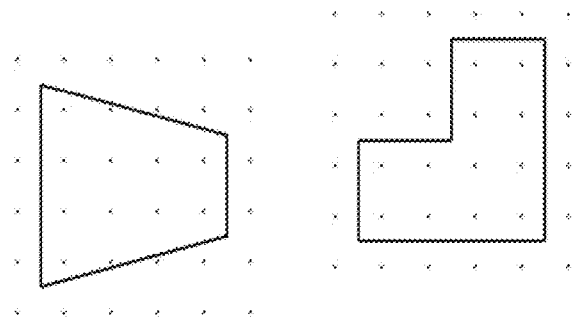
FIG. 4 shows two examples of indication matrices and segment shapes for processing by an image processing apparatus according to an embodiment.

FIG. 4 shows the indication matrix In, i.e. the interior (1's) and exterior pixels (0's) for two exemplary polygonal domains, namely a domain or image segment having the shape of a trapezoid as well as a domain or image segment having an L-shape, which are described by their vertices (e.g., returned by the matlab function "inpolygon.m").

Figure 5:
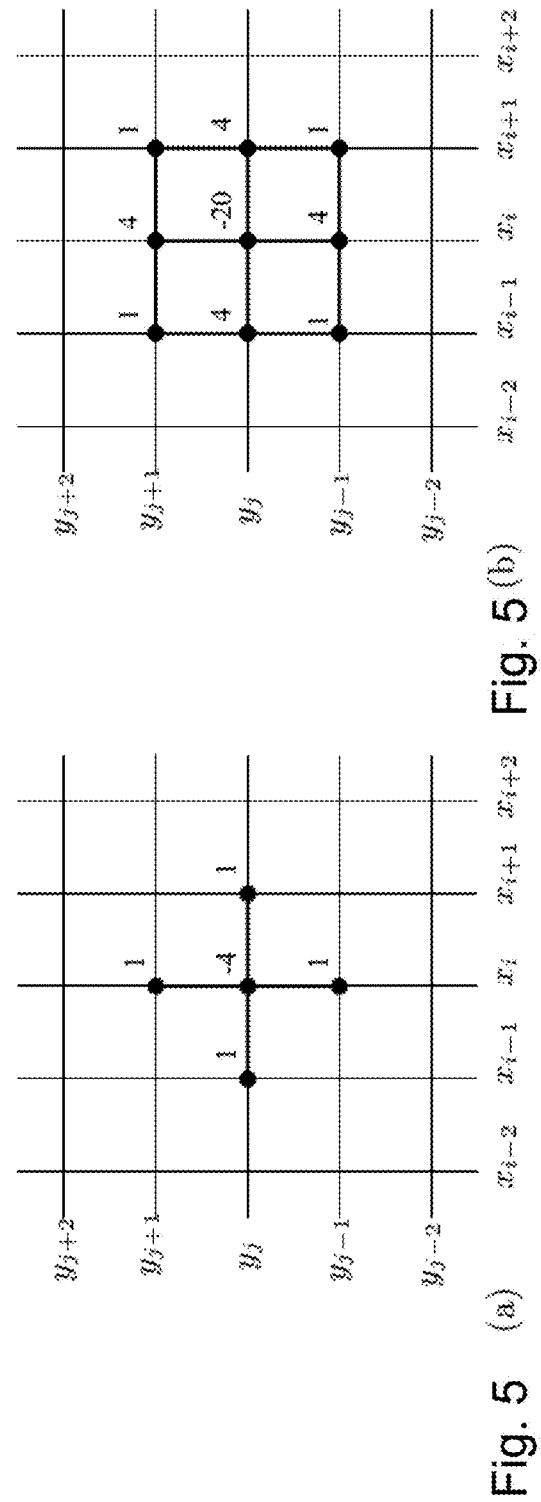
FIGS. 5(a) and 5(b) illustrate a 5-point stencil and a 9-point stencil approximation for the discretized Laplacian operator implemented in an image processing apparatus according to an embodiment.

Before setting the boundary conditions, the type of the Laplacian Stencil can be defined in accordance with embodiments of the disclosure. Several possible approximations for the Discrete Laplacian can be used according to embodiments of the disclosure, among them, the five-point stencil for the Laplacian:

$$\nabla_5^2 = \frac{1}{h^2}(\delta_{i-1,j} + \delta_{i+1,j} + \delta_{i,j-1} + \delta_{i,j+1} - 4\delta_{i,j})$$

and the nine-point stencil for the Laplacian:

$$\nabla_9^2 = \frac{1}{6h^2}(4\delta_{i-1,j} + 4\delta_{i+1,j} + 4\delta_{i,j-1} + 4\delta_{i,j+1}) +$$

$$\frac{1}{6h^2}(\delta_{i-1,j-1} + \delta_{i-1,j+1} + \delta_{i+1,j-1} + \delta_{i+1,j+1} + 20\delta_{i,j})$$

where $\delta_{i,j}$ denotes the Kronecker delta with $\delta_{i,j}=1$ only for i=j=0 and $\delta_{i,j}=0$ otherwise. FIG. 5 illustrates the five-point stencil (FIG. 5a) and the nine-point stencil (FIG. 5b) for the Laplacian as used by the image processing apparatus 100, 110 according to an embodiment.

In an embodiment, the boundary B of the image domain D is defined according to the selected Laplacian stencil. In an embodiment, a Pixel(x,y) is a boundary pixel of D, when the two following conditions hold: (i) Pixel(x,y) is not in D (i.e., not a domain-pixel In(x,y)=0); and (ii) Pixel(x,y) has at least one N-points-neighborhood pixel which is in D, where N=4 and N=8 for the 5 and 9-point stencil, respectively. That is, for the 5-point stencil, $In(x+i, y+_j)=1$, for at least one element (i,j) in the set: {(−1,0), (0,−1), (0,1), (1,0)}, whereas, for the 9-point stencil, In(x+i, y+j)=1, for at least one element (i,j) in the set: {(−1,−1), (−1,0), (−1,1), (0,−1), (0,1), (1,−1), (1,0), (1,1)}.

As already mentioned above, each type of boundary condition, which is determined for the same image domain D, generally produces a distinct solution to the discrete Laplacian eigenproblem. According to embodiments of the disclosure, boundary conditions may be set either on a center grid point, boundary-pixel, or a mid-point, half distance between a domain-pixel and a boundary-pixel. Among the possible boundary conditions, that in accordance with embodiments of the disclosure may be expressed as αu+β∂u/∂n, with α and β constants, are:
1) Dirichlet BC: u=0 on the boundary of D(β=0)
2) Neumann BC: ∂u/∂n=0 on the boundary of D(α=0)
3) Mixed BC: e.g., part of the boundary with u=0, wherein, the reminder of the boundary with ∂u/∂n=0, or, even with both α and β nonzero.

In an embodiment, wherein the image domain D comprises K domain pixels in D the image processing apparatus 100, 110 is configured to generate a linear system of K equations with K unknowns by approximating the Laplace equation at the K domain-pixels using the BC. As the determinant of the K×K system matrix A of the linear system of K equations is generally not zero, there exists exactly one solution (as can be shown mathematically).

Figure 6:
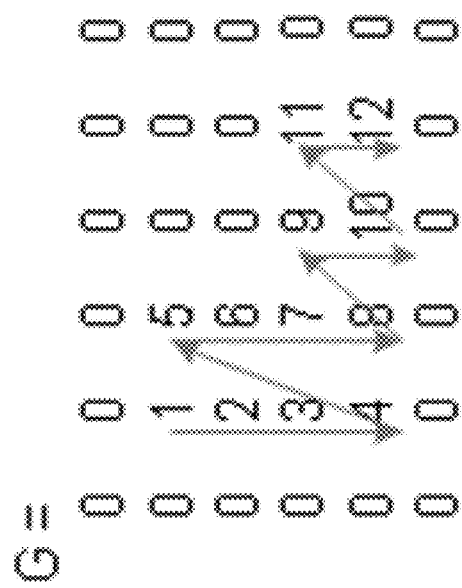
FIG. 6 illustrates a column stacking scanning order as implemented in an image processing apparatus according to an embodiment in the context of an exemplary L-shaped image segment.
Figure 7:
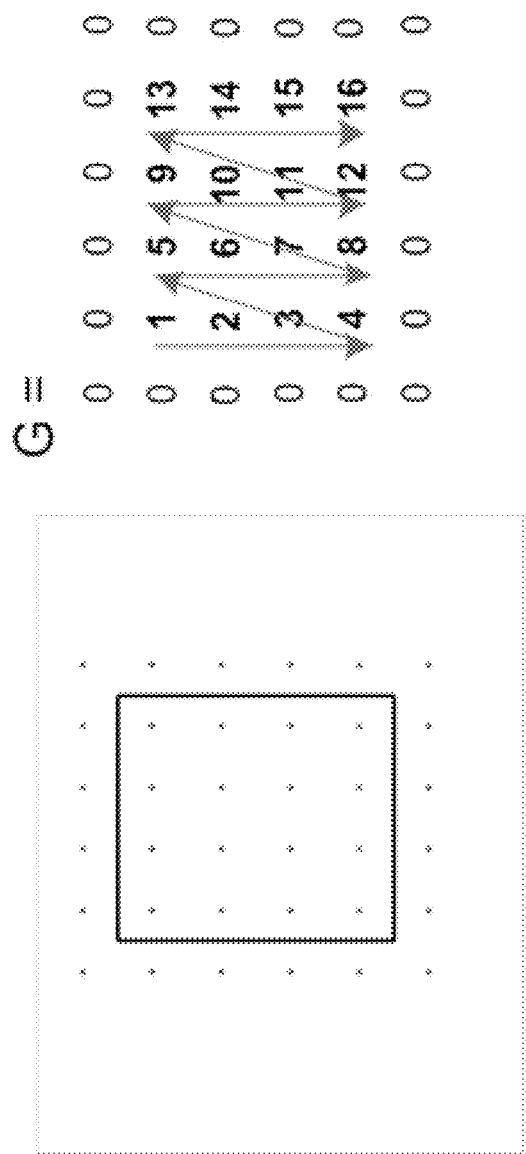
FIG. 7 illustrates the column stacking scanning order as implemented in an image processing apparatus according to an embodiment in the context of an exemplary square-shaped image segment.

In an embodiment, a scanning order G for the K non-zero elements of the indication matrix In(x,y), k=1, 2, . . . , K can be defined. For instance, a column stacking order may be used, starting from the upper to the lower element of the left column, then, to the upper element of the next column, and so forth till the rightmost column. Exemplary scanning orders G, which can be used by the image processing apparatus 100, 110 according to an embodiment, are shown in FIG. 6 for the L-shaped image segment of FIG. 4 and in FIG. 7 for a square-shaped image segment.

In an embodiment the image processing apparatus 100, 110 is configured to construct the system matrix A such that the k-th row thereof is the discrete Laplacian for the k-th domain-pixel with the defined BC, where k is the k-th element in the scanning order G.

Figure 8:
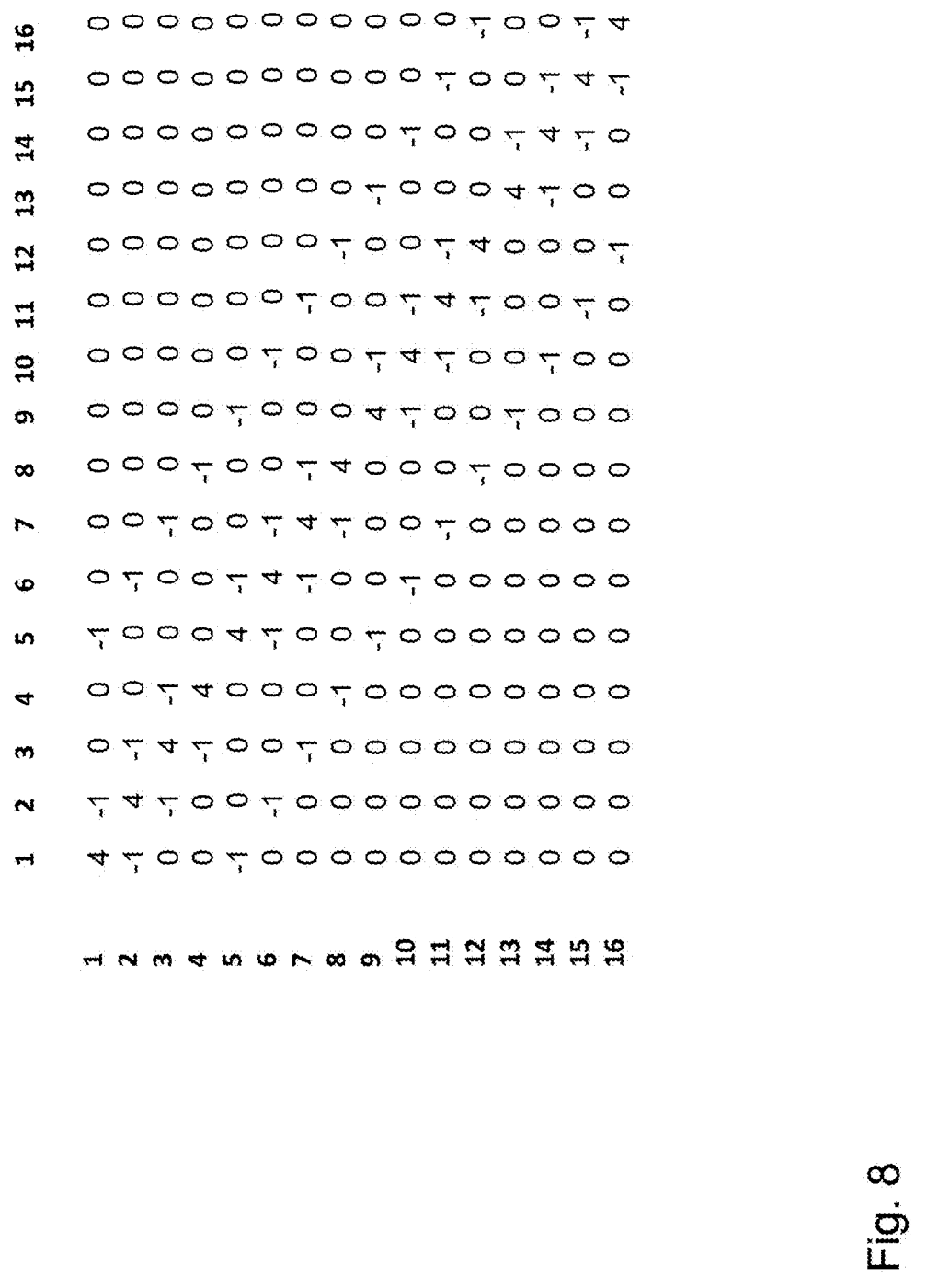
Figure 9A:
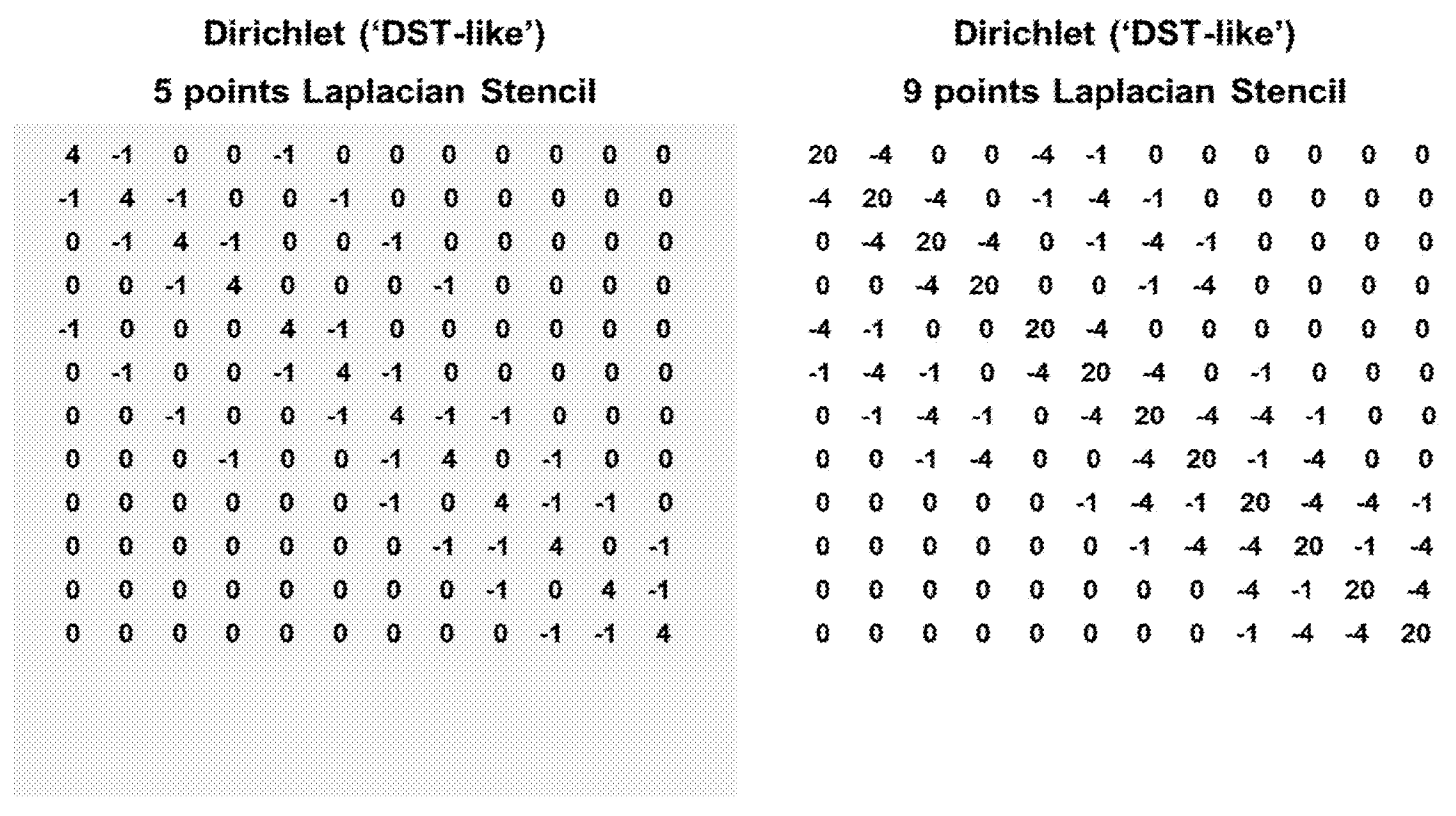
Figure 9B:
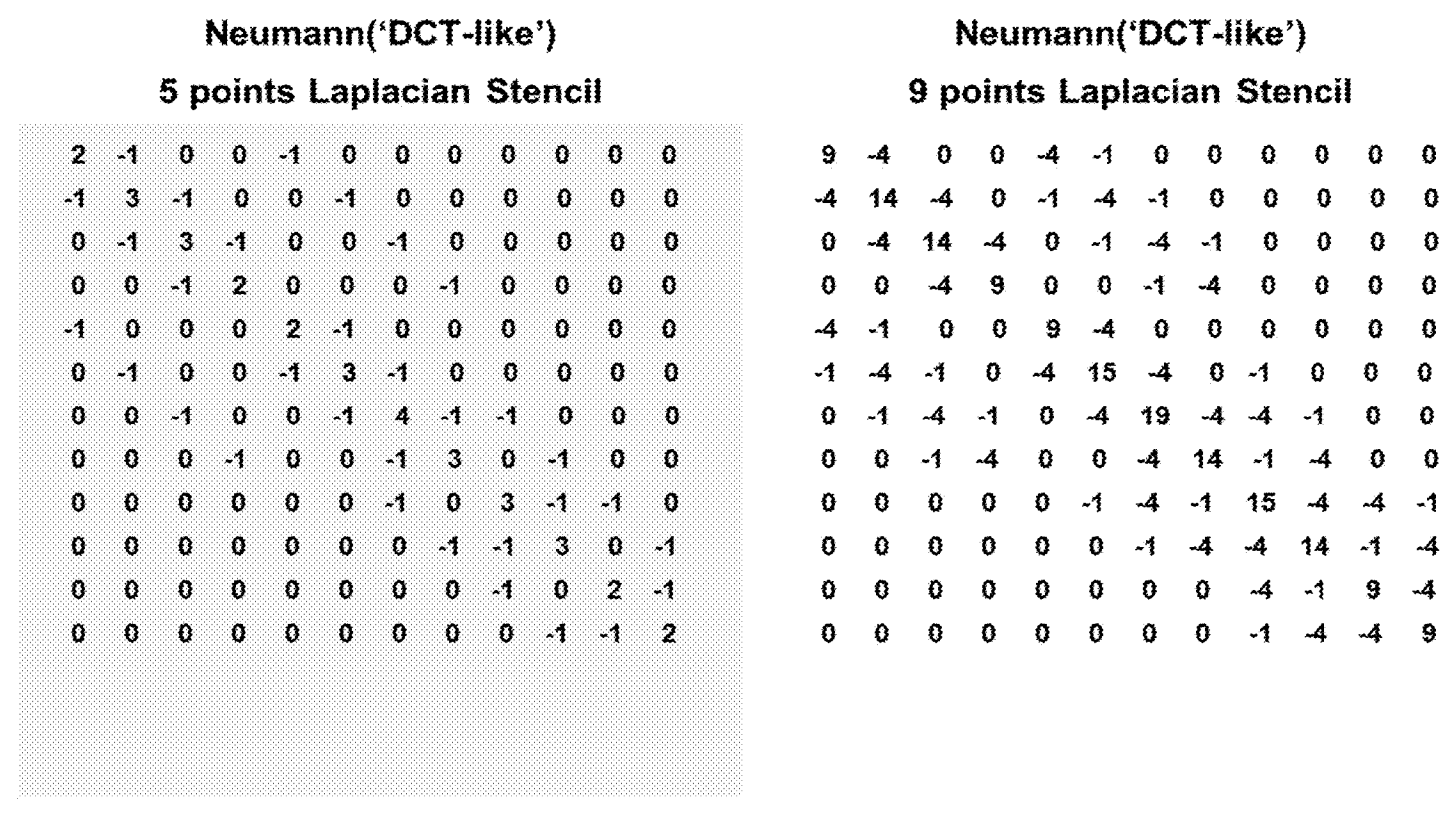

FIGS. 8, 9a and 9b illustrate examples for the system matrix A of the linear system of equations for the approximation of the Laplace equation $u_{xx}+u_{yy}=0$, when setting Dirichlet and Neumann BC, at a center point on a uniform grid, using a 5-point and 9-point stencil for the Laplacian. More specifically, FIG. 8 shows an exemplary system matrix A for the square-shaped image segment of FIG. 7 for Dirichlet BC and using a 5-point stencil for the Laplacian (the elements in the scanning order are shown in the top row and the leftmost column of the system matrix A shown in FIG. 8). FIGS. 9a and 9b show exemplary system matrices A for the L-shaped image segment of FIG. 4 and the scanning order G defined in FIG. 6 using a 5-point stencil (left) and a 9-point stencil (right) for the Laplacian for Dirichlet (FIG. 9a) and Neumann (FIG. 9b) boundary conditions, respectively.

In an embodiment, the image processing apparatus 100, 110 is configured to generate the 2D orthogonal and complete basis set for the domain D with the predefined BC by computing the eigenvalues $\lambda_k$ and eigenvectors $v_k$ of the system matrix A:

$$Av_k=\lambda_k v_k, k=1,2,\ldots,K \qquad (12)$$

The eigenvectors of the system matrix A form a complete and orthogonal basis set of the image segment of domain D with the predefined BC:

$$VV^T=V^TV=I \qquad (13)$$

where $v_k$ defines the k-th column of the transformation matrix V and I denotes the K×K identity matrix.

As will be appreciated, the order of the eigenvalues determines the order of the spatial "frequencies". Thus, for Dirichlet BC ("DST-like")

$$0<\lambda_1\leq\lambda_2\ldots\leq\lambda_i\ldots\leq\lambda_K \qquad (14)$$

and for Neumann BC ("DCT-like")

$$0=\hat{\lambda}_1\leq\hat{\lambda}_2\ldots\leq\hat{\lambda}_i\ldots\leq\hat{\lambda}_K \qquad (15)$$

with the first (smallest) eigenvalue corresponding to the smallest spatial "frequency". In an embodiment, the image processing apparatus 100, 110 can use publicly available solvers using Numerical Linear Algebra libraries for determining the eigenvectors and eigenvalues of the system matrix A. Exemplary eigenvectors for differently shaped image segments as generated and used by the image processing apparatus 100, 110 according to an embodiment will be described further below in the context of FIGS. 21a, 21b to 25a, 25b.

As already described above, the image processing apparatus 100, 110 is configured to compress or decompress an image segment on the basis of the eigenvectors of the system matrix A.

Given the samples, i.e. pixel values, of the image segment, indicated by the matrix elements In(x,y), the image processing apparatus 100, 110 can construct a K×1 vector p from the image samples using the same scanning order G, as defined for the domain pixels, which are located at the non-zero elements of the indication matrix In(x,y). The k-th transform coefficient $c_k$ can be obtained as an inner product of the corresponding eigenvector $v_k$ and the vector of samples p:

$$c_k = v_k^T p \quad (16)$$

In matrix notation the vector of coefficients c can be defined as:

$$c = V^T p \quad (17)$$

which is an orthonormal transformation by the matrix V from the image sample vector p to the spectral domain represented by the coefficient vector c. The inverse transform produces the reconstructed vector, $p_{rec}$ defined as a combination of the eigenvectors $v_k$ using the coefficients as the weights of the combination:

$$p_{rec} = \Sigma_{k=1}^K c_k v_k = Vc \quad (18)$$

In matrix notation the reconstructed vector is obtained by the inverse transformation matrix V applied to the coefficient vector. As will be appreciated, the reconstruction is perfect, since $VV^T = I$:

$$p_{rec} = vc = VV^T p = p \quad (19)$$

Figure 10:
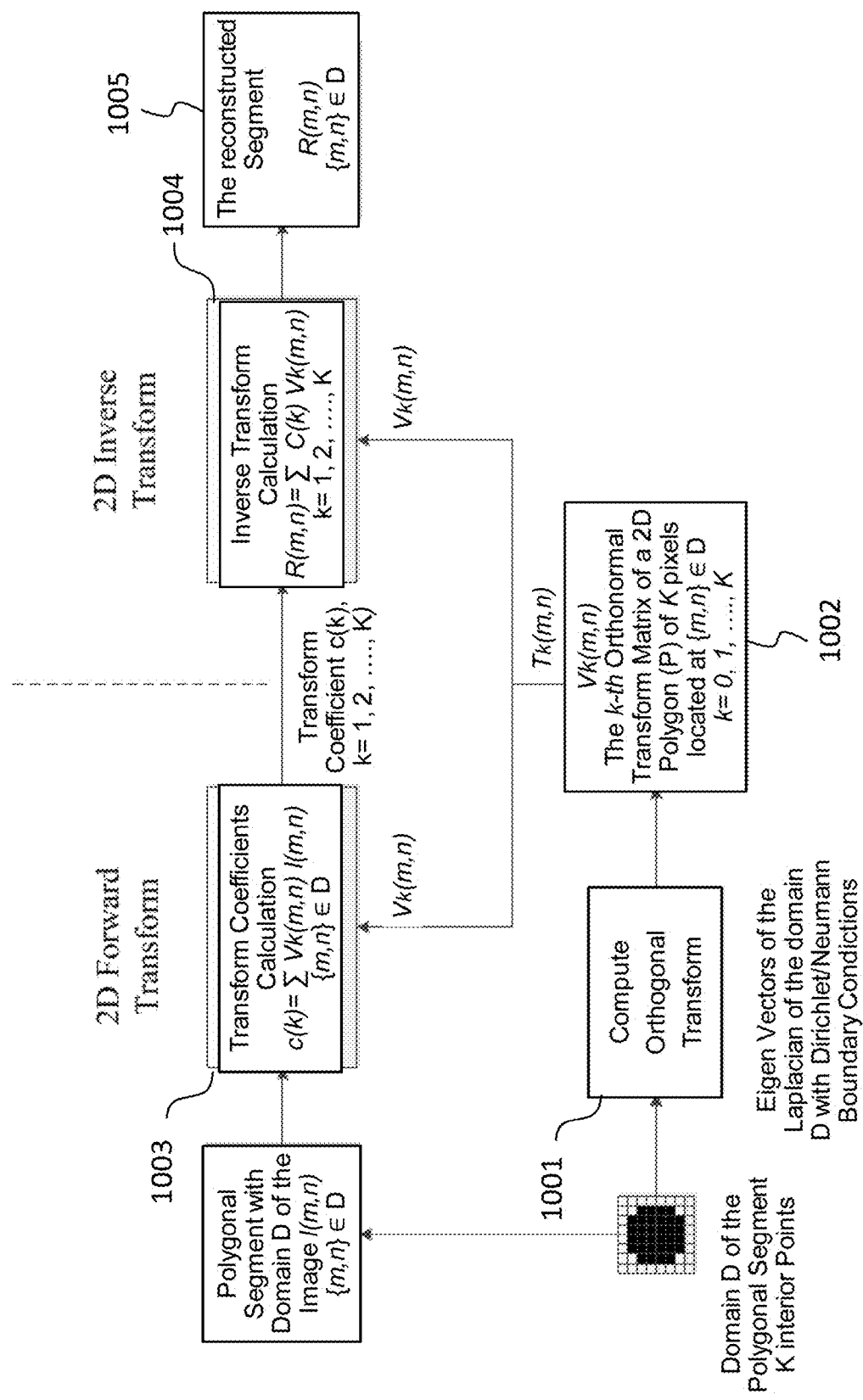
FIG. 10 shows a schematic diagram illustrating processing steps of an image processing apparatus for compressing an image segment according to an embodiment and an image processing apparatus for decompressing an image segment according to an embodiment.

Corresponding processing steps implemented in the image processing apparatus 100 according to an embodiment and the image processing apparatus 110 according to an embodiment are illustrated in FIG. 10. The lower part of FIG. 10 illustrates the generation of the eigenvectors and the transformation matrix (blocks 1001 and 1002) on the basis of the shape of the image domain as defined by the indication matrix. The upper part of FIG. 10 illustrates on the left the generation of the transform coefficients by the image processing apparatus 100 (block 1003) on the basis of the transformation matrix. On the right of the upper part of FIG. 10 the use of the transform coefficients by the image processing apparatus 110 is illustrated for reconstructing the image segment (blocks 1004 and 1005).

Figure 11:
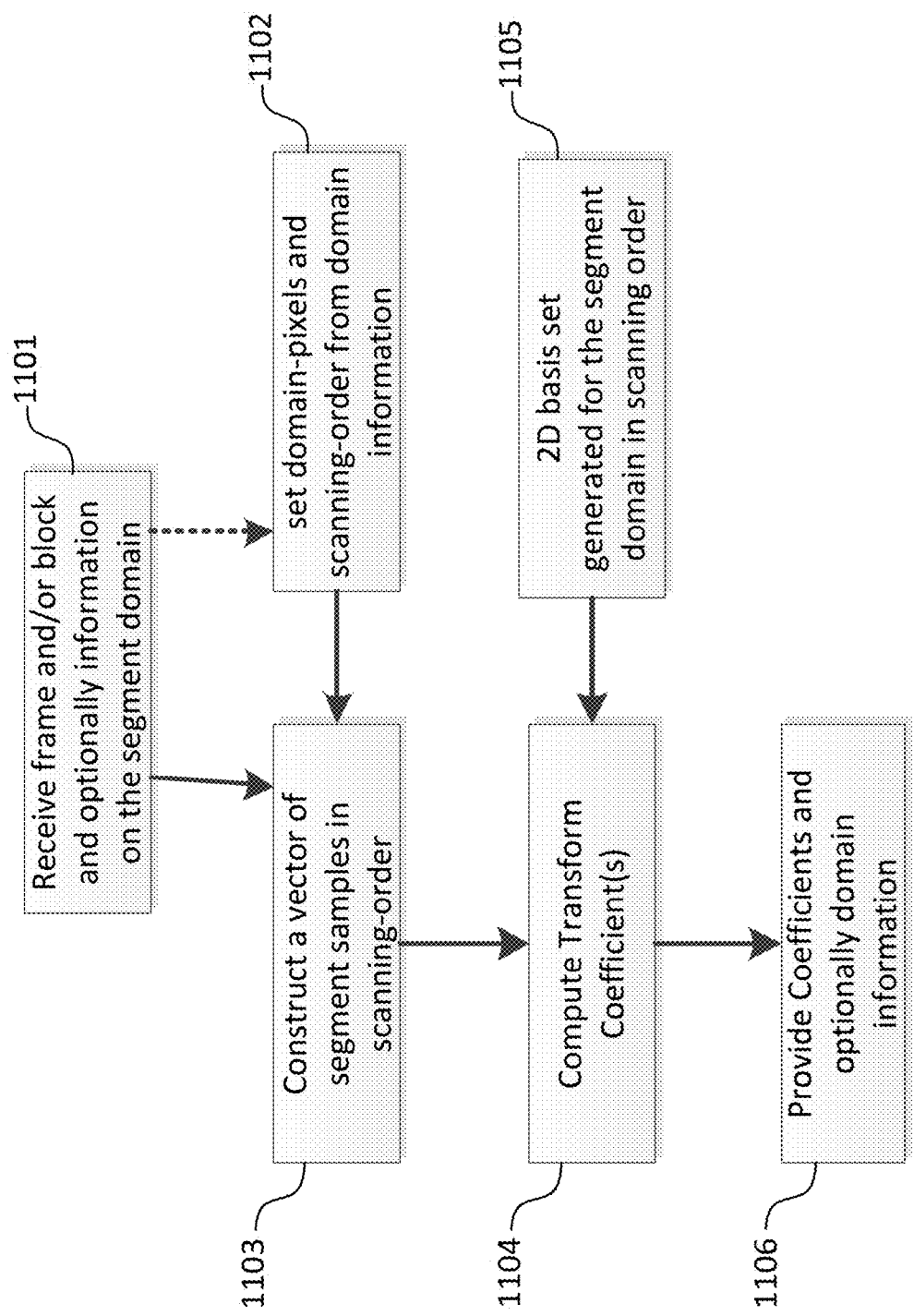
FIG. 11 shows a schematic diagram illustrating processing steps of an image processing apparatus for compressing or encoding an image segment according to an embodiment.
Figure 12:
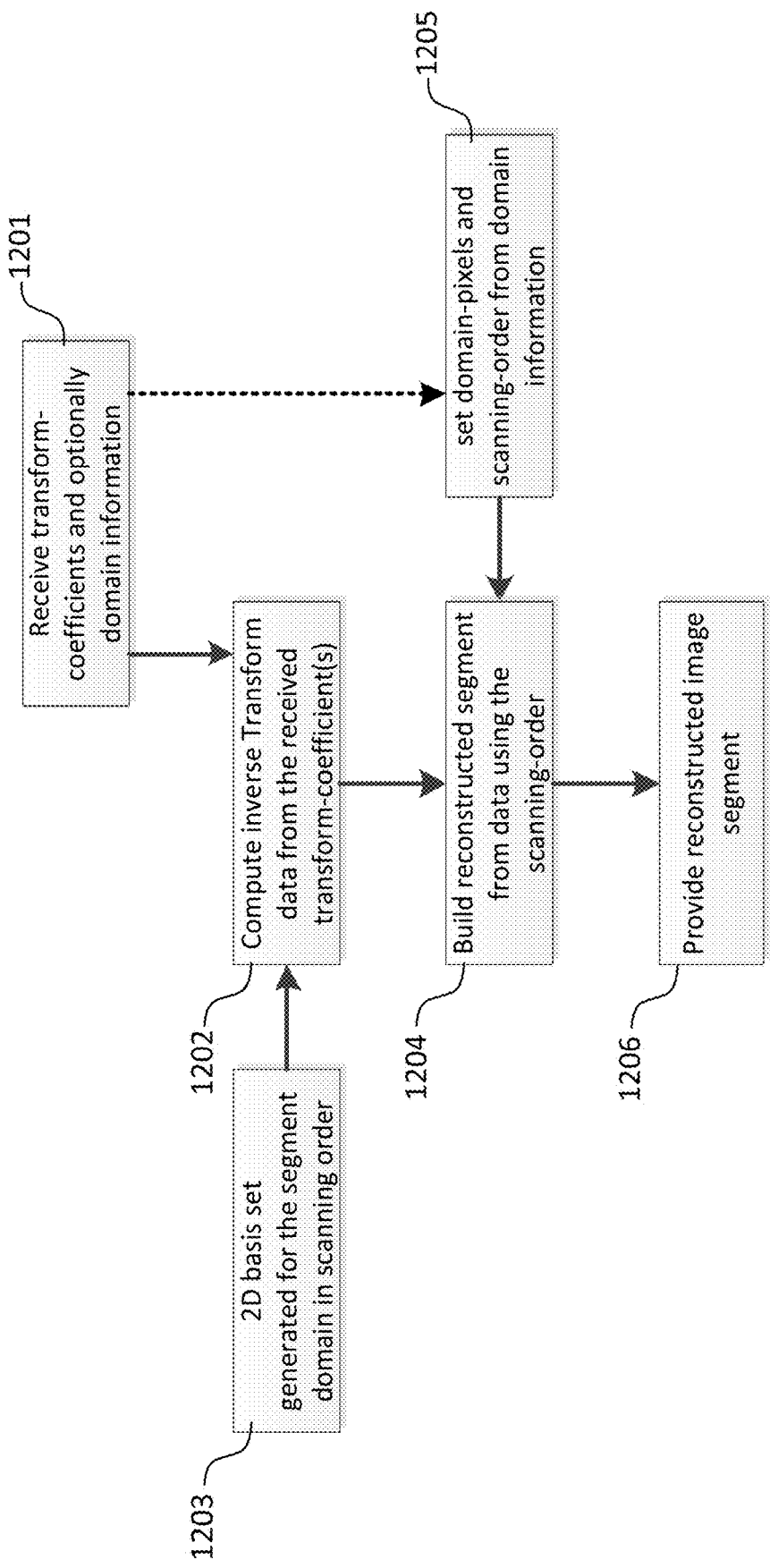
FIG. 12 shows a schematic diagram illustrating processing steps of an image processing apparatus for decompressing or decoding an image segment according to an embodiment.

FIG. 11 shows a schematic diagram illustrating in more detail processing steps performed by the image processing apparatus 100 for compressing or encoding an image segment according to an embodiment. In a step 1101, the image processing apparatus 100 receives the image segment, which can be part of a video frame or an image block, and possibly further domain information, such as the chosen boundary conditions and/or a predefined scanning order. In a step 1102 the image processing apparatus 100 can use this domain information for setting the image domain pixels and the scanning order. In a step 1103 the image processing apparatus 100 constructs a vector of segment samples on the basis of the scanning order. In steps 1104, 1105 the image processing apparatus 100 computes the transform coefficients $c_k$ on the basis of the eigenvectors of the system matrix in the manner described above. In a step 1106 the image processing apparatus 100 provides the obtained transform coefficients as well as possible side information, for instance, if needed, descriptive information on the shape of the segment to the image processing apparatus 110. The corresponding processing steps implemented in the image processing apparatus 110 for decompressing the compressed image segment provided by the image processing apparatus 100 are illustrated in FIG. 12. As will be appreciated, the processing steps illustrated in FIG. 11 can define a processing loop of the image processing apparatus 100 or a corresponding video encoding apparatus 200 (as will be described in more detail further below in the context of FIG. 15).

Under reference to FIG. 12, on the basis of the received transform coefficients and possible side information (step 1201) the image processing apparatus 110 inverses the received transform coefficients using the eigenvectors of the system matrix (steps 1202 and 1203). As will be appreciated, the image processing apparatus 110 should use the same eigenvectors as the image processing apparatus 100. In a step 1204 the image processing apparatus 110 reconstructs the image segment on the basis of the predefined scanning order (step 1205). In a step 1206 the image processing apparatus 110 outputs the reconstructed image segment. As will be appreciated, the processing steps illustrated in FIG. 12 can define a processing loop of the image processing apparatus 110 or a corresponding video decoding apparatus 210 (as will be described in more detail further below in the context of FIG. 16).

Figure 13:
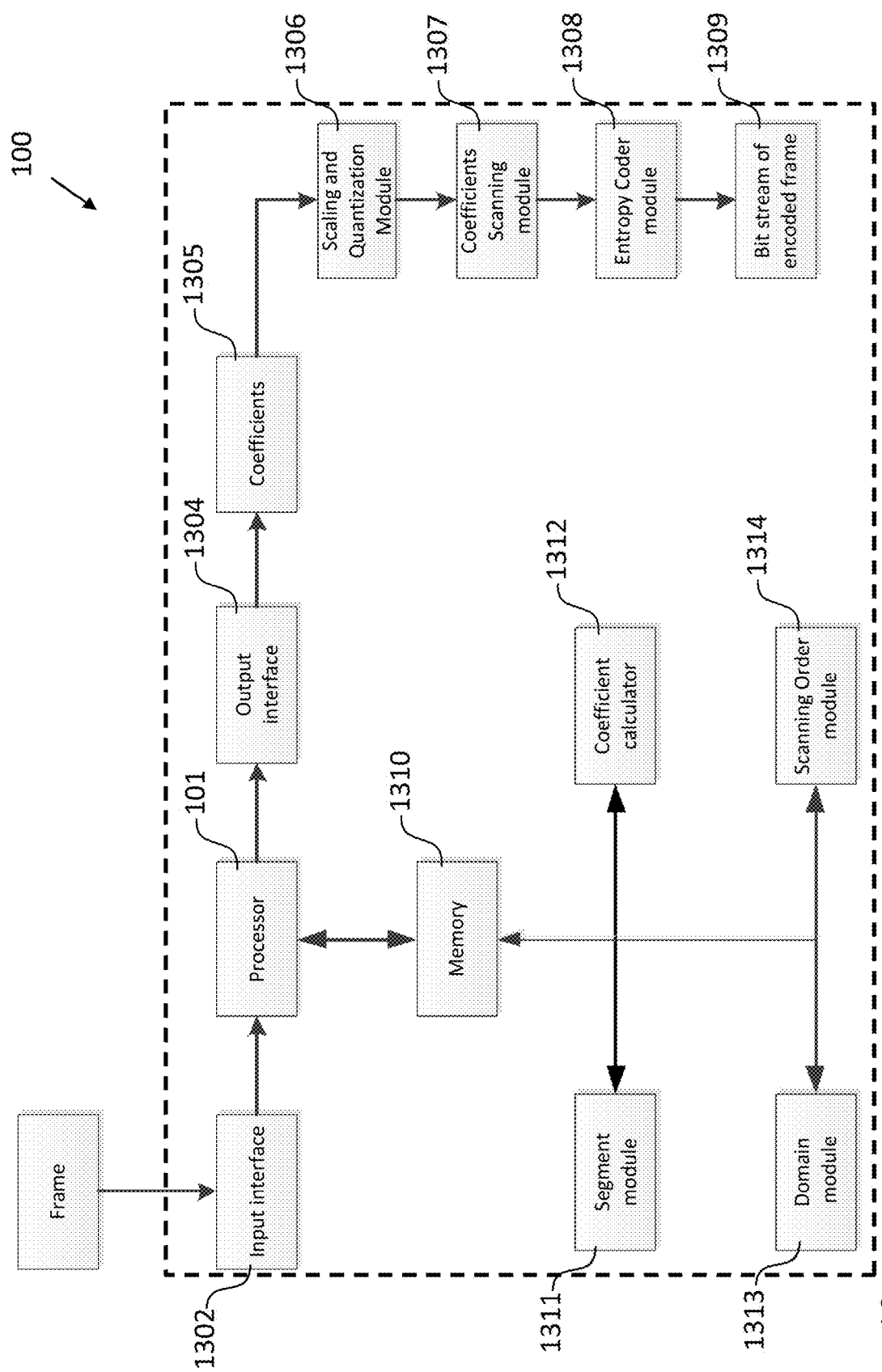
FIG. 13 shows a schematic diagram illustrating an image processing apparatus for compressing or encoding a frame according to an embodiment.

FIG. 13 shows a schematic diagram illustrating an embodiment of the image processing apparatus 100. In the embodiment shown in FIG. 13 the image processing apparatus 100 comprises an input interface 1302 for receiving a frame, image or image segment. In addition to the processor 101 already described above, the image processing apparatus 100 shown in FIG. 13 further comprises a memory 1310, a segment module 1311, a domain module 1313, a scanning order module 1314 and a coefficient calculator 1312 for determining the transform coefficients in the manner already described above. In FIG. 13 the segment module 1311, the domain module 1313, the scanning order module 1314 and the coefficient calculator 1312 are shown as blocks separate from the processor 101, which could be implemented as dedicated software and/or hardware blocks. As will be appreciated, however, in an embodiment the segment module 1311, the domain module 1313, the scanning order module 1314 and/or the coefficient calculator 1312 can be implemented as software modules running on the processor 101. The image processing apparatus 100 shown in FIG. 13 further comprises an output interface for providing the transform coefficients determined by the coefficient calculator 1310 to a scaling and quantization module 1306, a coefficient scanning module 1307 and an entropy coder module 1308 of the image processing apparatus 100. The entropy coder module 1308 of the image processing apparatus 100 is configured to provide the encoded frame, image or image segment, for instance, in form of a bit stream 1309.

Figure 14:
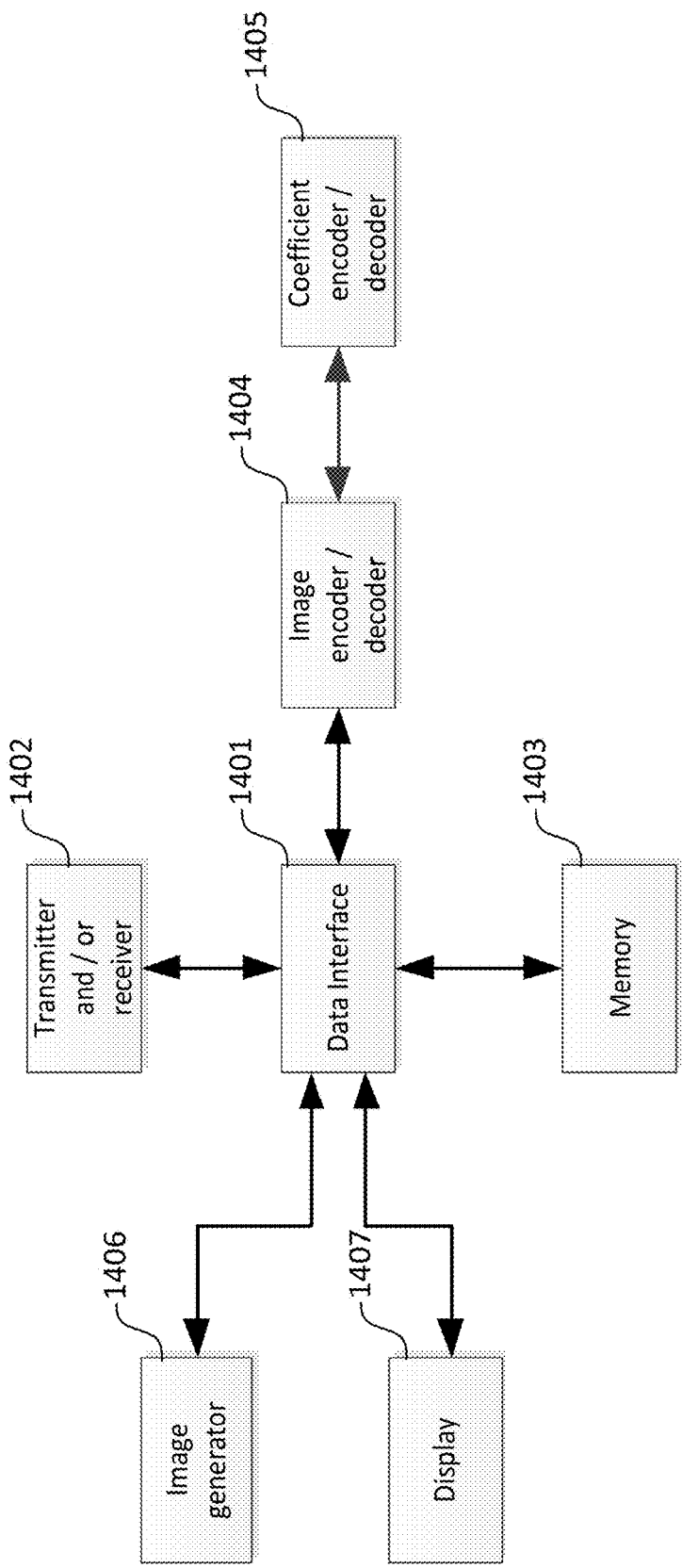
FIG. 14 shows a schematic diagram illustrating a video coding apparatus according to an embodiment.

FIG. 14 shows a schematic diagram illustrating the video coding apparatus 200, 210 according to an embodiment. As the main component, the video coding apparatus shown in FIG. 14 comprises the image encoder/decoder 1404. In the case of the video encoding apparatus 200 the image encoder/decoder 1404 can be the image processing apparatus 100. In the case of the video decoding apparatus 210 the image encoder/decoder 1404 can be the image processing apparatus 110.

In addition to the image encoder/decoder 1404 the video coding apparatus 200, 210 shown in FIG. 14 further comprises a transmitter/receiver 1402, a data interface 1401, a memory 1403 and a coefficient encoder/decoder 1405. Moreover, the video coding apparatus 200, 210 shown in FIG. 14 can comprise an image generator 1406 and/or a display 1407.

Figure 15:
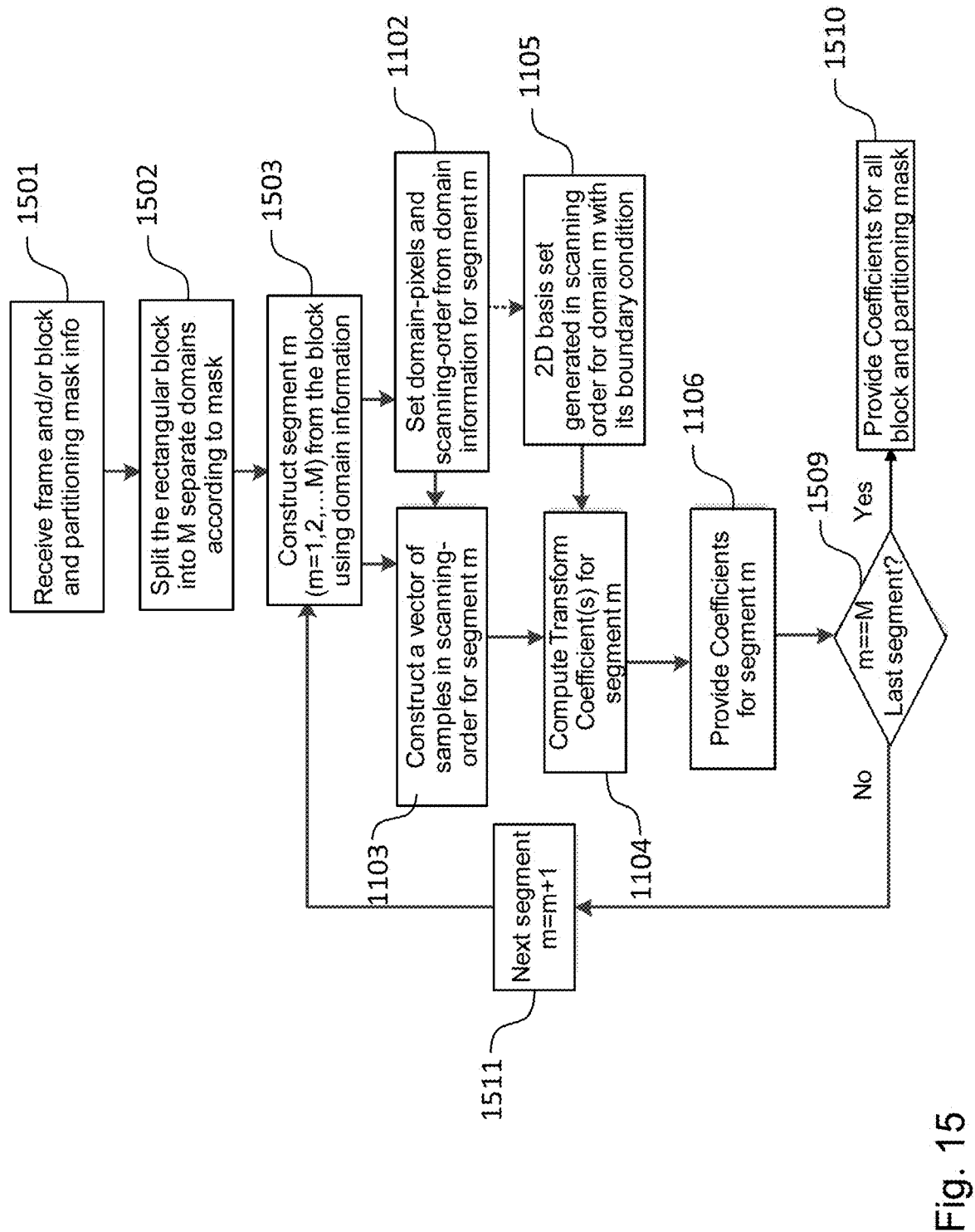
FIG. 15 shows a flow diagram illustrating processing steps of an image processing apparatus or a video coding apparatus for compressing or encoding the segments of a block in an image or a frame of a video according to an embodiment.

FIG. 15 shows a flow diagram illustrating processing steps of the image processing apparatus 100 according to an embodiment or the video coding apparatus 200 according to an embodiment for compressing or encoding the segments of a block in an image or a frame of a video. As will be appreciated, the flow diagram of FIG. 15 comprises the processing steps of FIG. 11 as a processing loop for processing each segment m from a frame or block received in a step 1501. The frame or block received in step 1501 can be part of a video signal comprising a plurality of frames. In a step 1502 the video encoding apparatus 200 splits the rectangular frame or block received in step 1501 into M separate domains or image segments. In an embodiment, these M separate domains or image segments can be defined by a partition mask. In a step 1503 the video encoding apparatus 200 retrieves the m-th image segment from the frame or block for providing the m-th image segment to the processing loop shown in FIG. 11 and described above. This loop is iterated as part of the flow diagram shown in FIG. 15 for all M segments of the frame or block (steps 1509 and 1511) until in a step 1510 the coefficients for the whole frame or block are provided.

Figure 16:
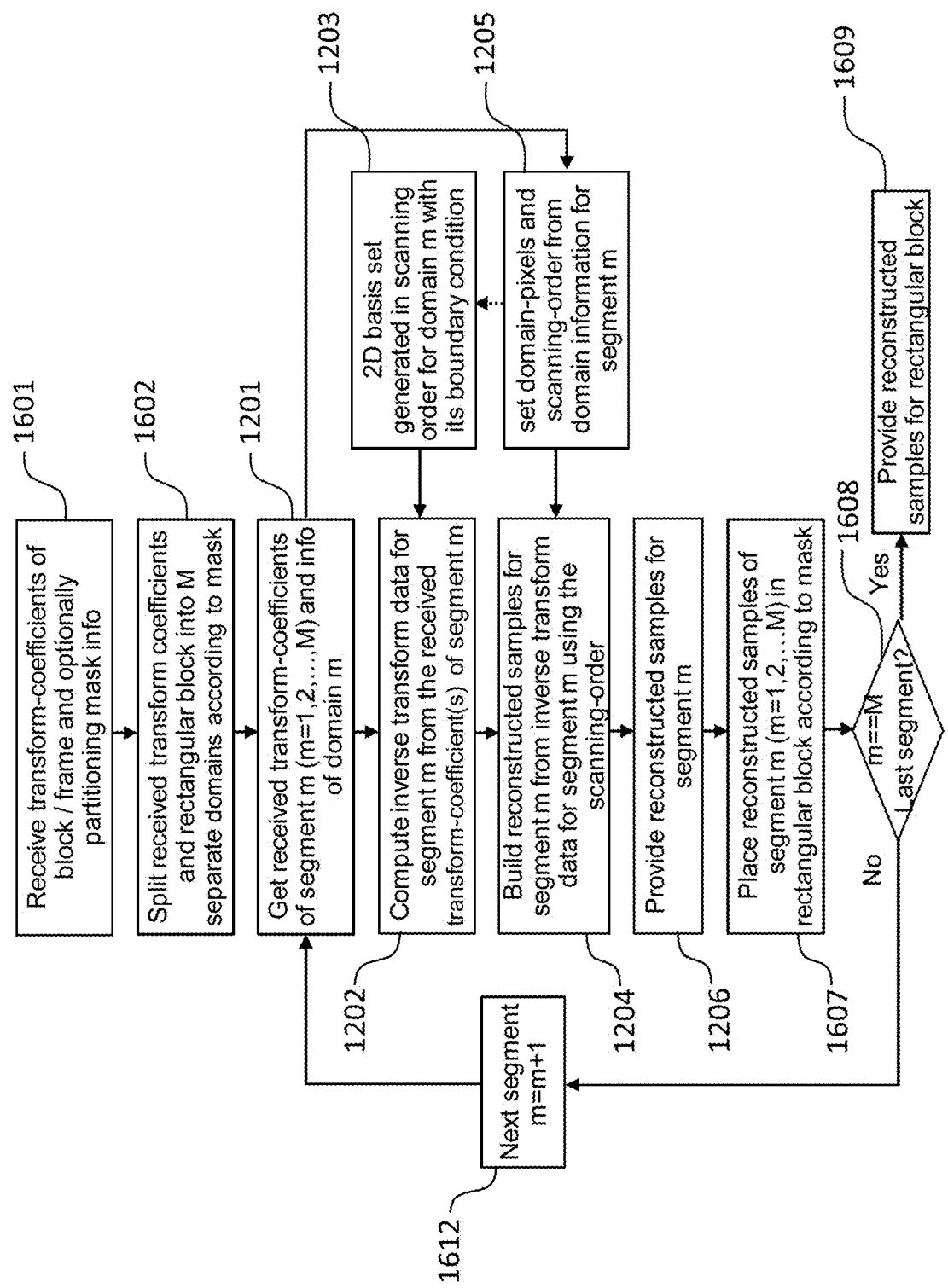
FIG. 16 shows a flow diagram illustrating processing steps of an image processing apparatus or a video coding apparatus for decompressing or decoding the segments of a block in an image or frame of a video according to an embodiment.

FIG. 16 shows a flow diagram illustrating the corresponding processing steps of the image processing apparatus 110 according to an embodiment or the video decoding apparatus 210 according to an embodiment for decompressing or decoding an encoded block in an image or a frame of a video. As will be appreciated, the flow diagram of FIG. 16 comprises the processing steps of FIG. 12 as a processing loop for processing the transform coefficients for each segment m from a frame or block received in a step 1601. In a step 1602 the image processing apparatus 110 or the video decoding apparatus 210 splits the received transform coefficients into M separate domains or image segments. In an embodiment, these M separate domains or image segments can be defined by a partition mask. The processing loop shown in FIG. 12 and already described above is iterated as part of the flow diagram shown in FIG. 16 for all M segments of the frame or block (steps 1608 and 1612) until in a step 1609 the reconstructed image segments for the whole frame or block are provided.

Figure 17:
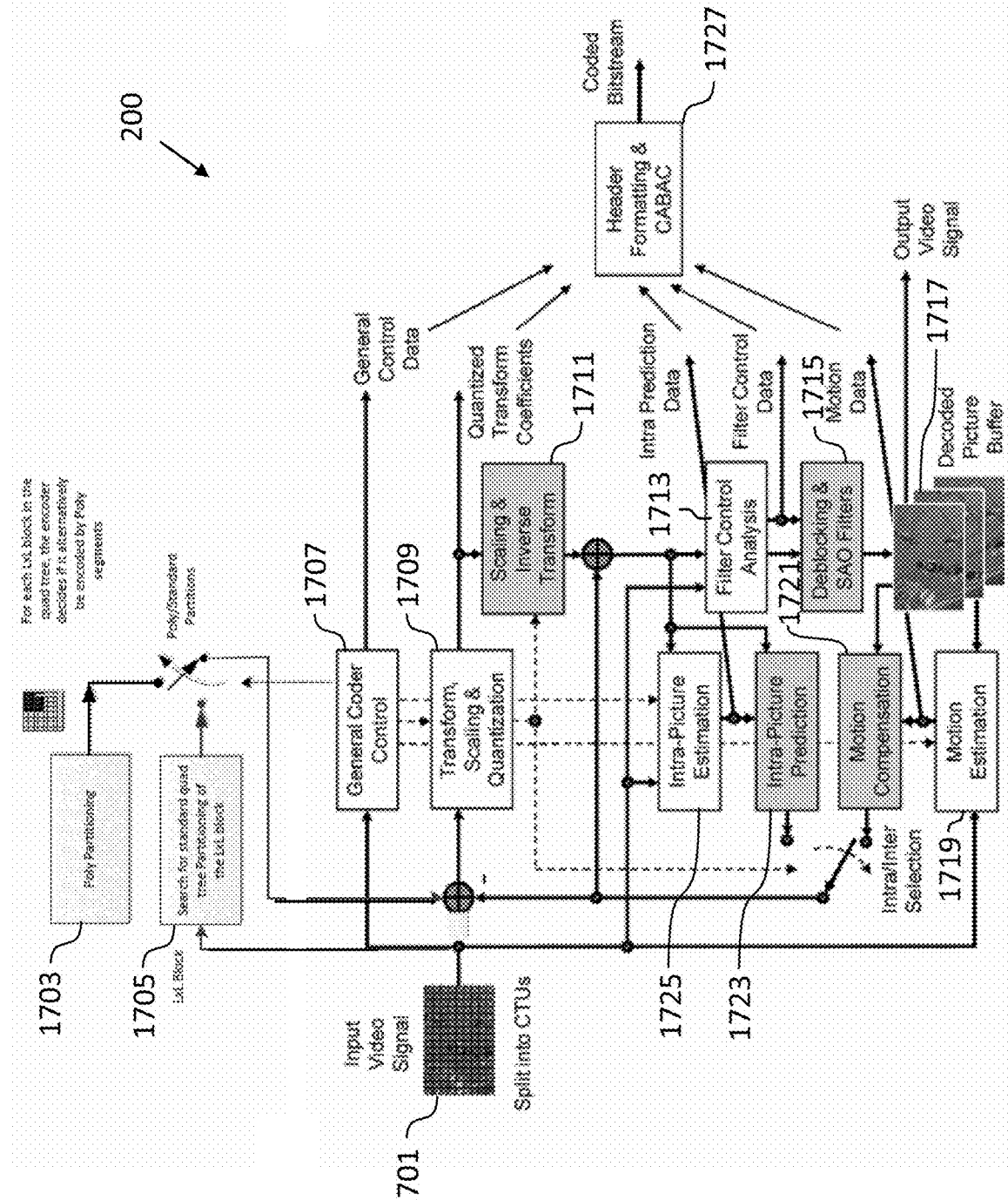
FIG. 17 shows a schematic diagram illustrating a video coding apparatus for encoding a video signal according to an embodiment.

FIG. 17 shows a schematic diagram illustrating an embodiment of the video encoding apparatus 200, which is based on the hybrid encoder architecture according to the H.265 standard. As the hybrid encoder architecture according to the H.265 standard is well known, the following description will focus on the differences of the embodiment shown in FIG. 17 in comparison with the hybrid encoder architecture according to the H.265 standard.

In hybrid video coding, an input frame is normally divided into blocks for further processing. The block partitioning is conveyed to the decoder, such as the video decoding apparatus 210 shown in FIG. 18. Usually, the first frame of an input video sequence is an intra frame, which is encoded using only intra prediction. An intra frame can be decoded without information from other frames. The video coding blocks of subsequent frames following the first intra frame can be coded using inter or intra prediction.

The video encoding apparatus 200 shown in FIG. 17 comprises a poly partitioning block 1703 and a block 1705 for searching for a standard quad tree partitioning of an L×L block as provided by a splitting block 1701 for splitting the input video signal into a plurality of CTUs. As indicated by an arrow in FIG. 17, a general coder control block 1707 of the video encoding apparatus 200 can be configured to decide for each L×L block in the quad tree if it should be encoded using non-rectangular image segments (herein also referred to as poly segments). In case of an encoding using non-rectangular image segments, a block 1709 of the video encoding apparatus 200 is configured to apply the transform, scaling and quantization to each of the non-rectangular image segments defining the L×L block of the quad tree and a block 1711 of the video encoding apparatus 200 is configured to apply a scaling and an inverse transform to each of these segments.

Moreover, the video encoding apparatus 200 shown in FIG. 17 comprises an intra-prediction estimation block 1725, an intra-picture prediction block 1723, a motion compensation block 1721, a motion estimation block 1719, a filter control analysis block 1713, a deblocking & SAO filters block 1715, a decoded picture buffer 1717 and a header formatting & CABAC block 1727, which are generally known from the hybrid encoder architecture according to the H265 standard. The intra-prediction estimation block 1725 is configured to provide a separate intra predictor for each of the non-rectangular image segments defining the L×L block of the quad tree. Likewise, the motion estimation block 1719 is configured to provide a separate motion vector (MV) for each of the non-rectangular image segments.

The general control data provided by the general coder control block 1707 can comprise a header for signaling the partitioning mask. The header formatting & CABAC block 1727 can use new entropy models for signaling the transform coefficients for the non-rectangular image segments, the type of partitioning mask and the intra predictors for each non-rectangular image segment. As will be appreciated, the video coding apparatus 200 shown in FIG. 17 is configured to use both rectangular as well as non-rectangular image segments for encoding a frame of a video signal.

Figure 18:
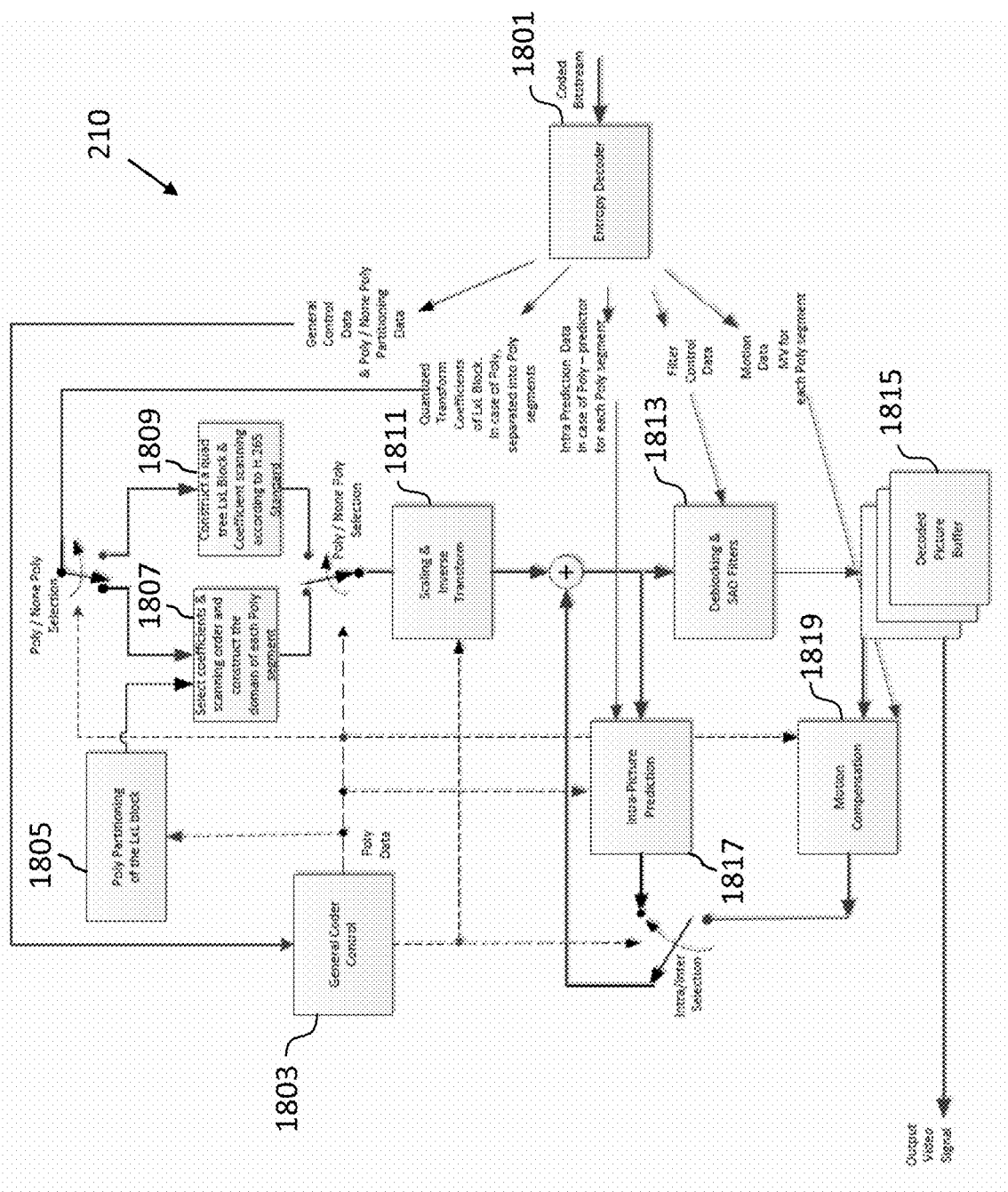
FIG. 18 shows a schematic diagram illustrating a video coding apparatus for decoding a video signal according to an embodiment corresponding to the video encoding apparatus of FIG. 17.

FIG. 18 shows a schematic diagram illustrating a corresponding embodiment of the video decoding apparatus 210. As in the case of the video encoding apparatus 200 shown in FIG. 17, the video decoding apparatus 210 shown in FIG. 18 is based on the H.265 architecture as well. As the hybrid decoder architecture according to the H.265 standard is well known, the following description will focus on the differences of the embodiment shown in FIG. 18 in comparison with the hybrid decoder architecture according to the H.265 standard.

In addition to the general components or blocks of a H.265 hybrid decoder, namely an entropy decoder 1801, a block 1809 for constructing a quad tree L×L block, a scaling & inverse transform block 1811, a deblocking & SAO filters block 1813, a decoded picture buffer 1815, a motion compensation block 1819, an intra-picture prediction block 1817 and a general coder control block 1803, the video decoding apparatus 210 shown in FIG. 18 comprises a block 1807 configured to select transform coefficients as well as the scanning order for constructing the domain of each non-rectangular image segment and block 1805 for partitioning the L×L block into non-rectangular image segments.

Figure 19:
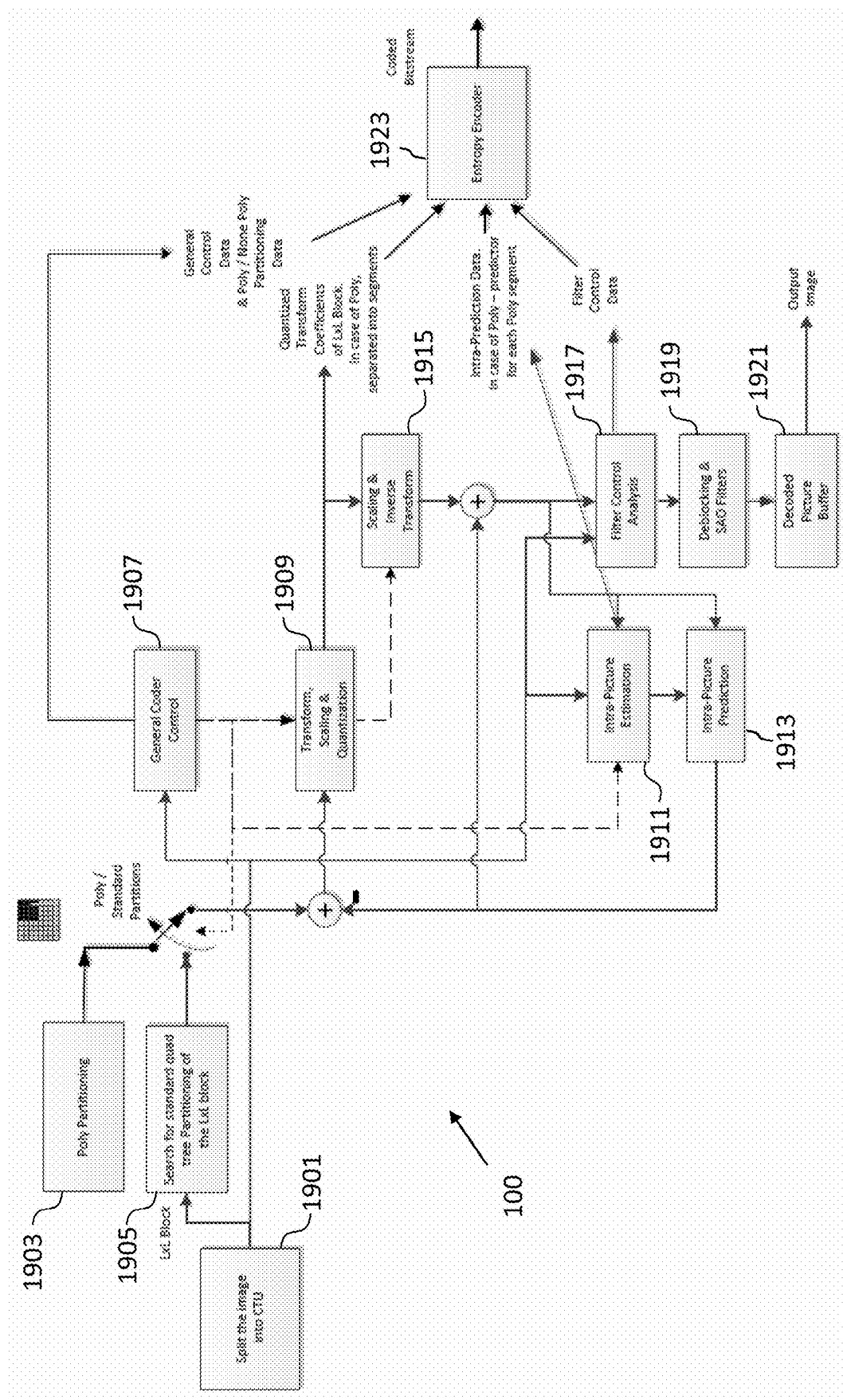
FIG. 19 shows a schematic diagram illustrating an image processing apparatus for encoding an image according to an embodiment.

FIG. 19 shows a schematic diagram illustrating a further embodiment of the image processing apparatus 100 for encoding an image. The image encoding apparatus 100 shown in FIG. 19, which is configured to perform encoding on the basis of intra-prediction, comprises components or blocks, which are similar or identical to corresponding components or blocks of the video encoding apparatus 200 shown in FIG. 17, which is configured to perform encoding on the basis of intra-prediction as well as inter-prediction.

More specifically, the image encoding apparatus 100 shown in FIG. 19 comprises a block 1901 for splitting the image into a CTU, a poly partitioning block 1903 and a block 1905 for searching for a standard quad tree partitioning of an L×L block as provided by the splitting block 1901. As indicated by an arrow in FIG. 19, the general coder control block 1907 of the image encoding apparatus 100 can be configured to decide for each L×L block in the quad tree if it should be encoded using non-rectangular image segments (herein also referred to as poly segments). Moreover, the image encoding apparatus 100 shown in FIG. 19 comprises a block 1909 configured to apply the transform, scaling and quantization to each of the non-rectangular image segments defining the L×L block of the quad tree, a block 1915 configured to apply a scaling and an inverse transform to each of these segments, an intra-picture estimation block 1911, an intra-picture prediction block 1913, a filter control analysis block 1917, a deblocking & SAO filters block 1919, a decoded picture buffer 1921 and an entropy encoder 1923. As these components or blocks already have been described in the context of FIG. 17, reference is made to the description above.

Figure 20:
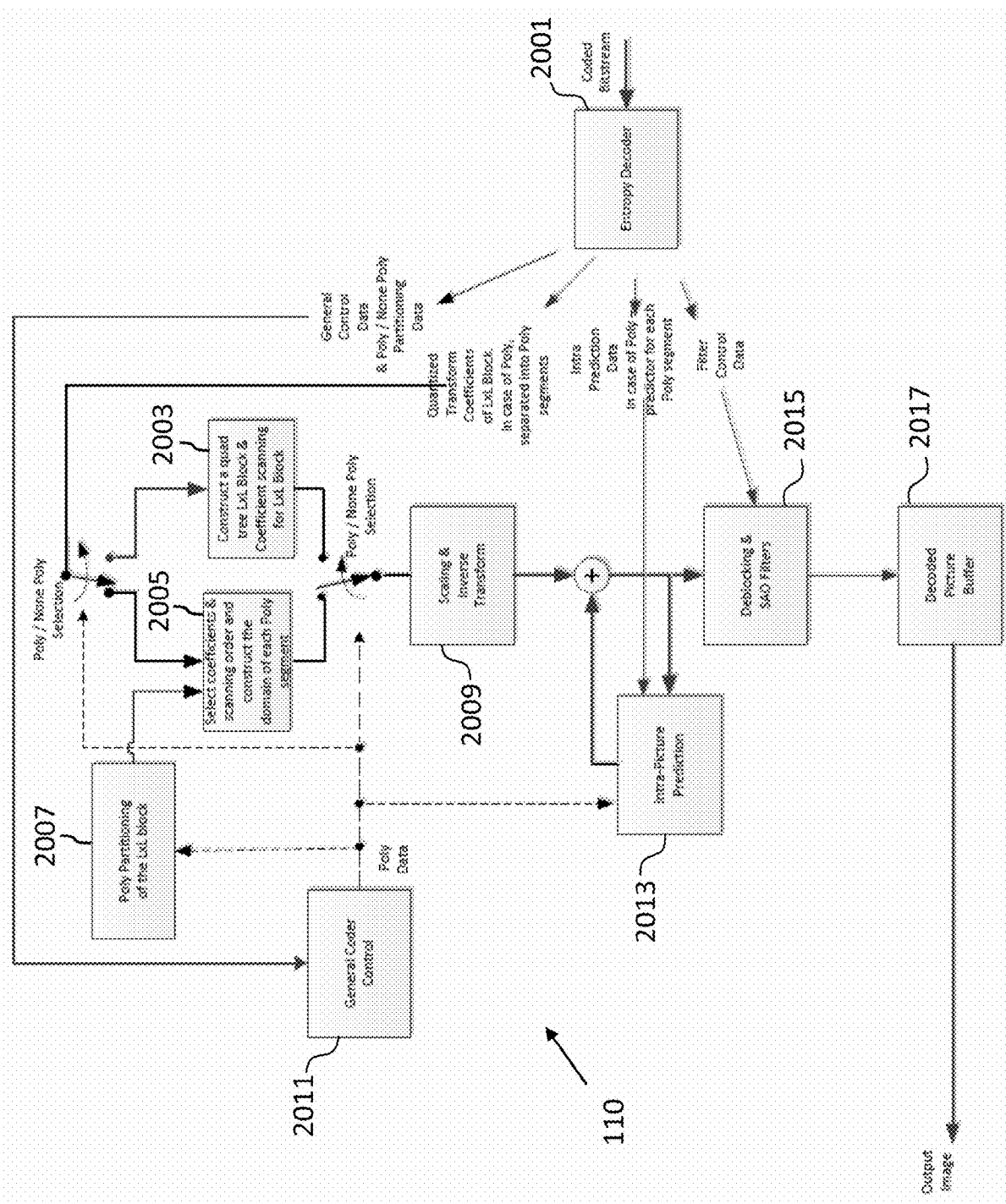
FIG. 20 shows a schematic diagram illustrating an image processing apparatus for decoding an image according to an embodiment corresponding to the image encoding apparatus of FIG. 19.
Figure 21A:
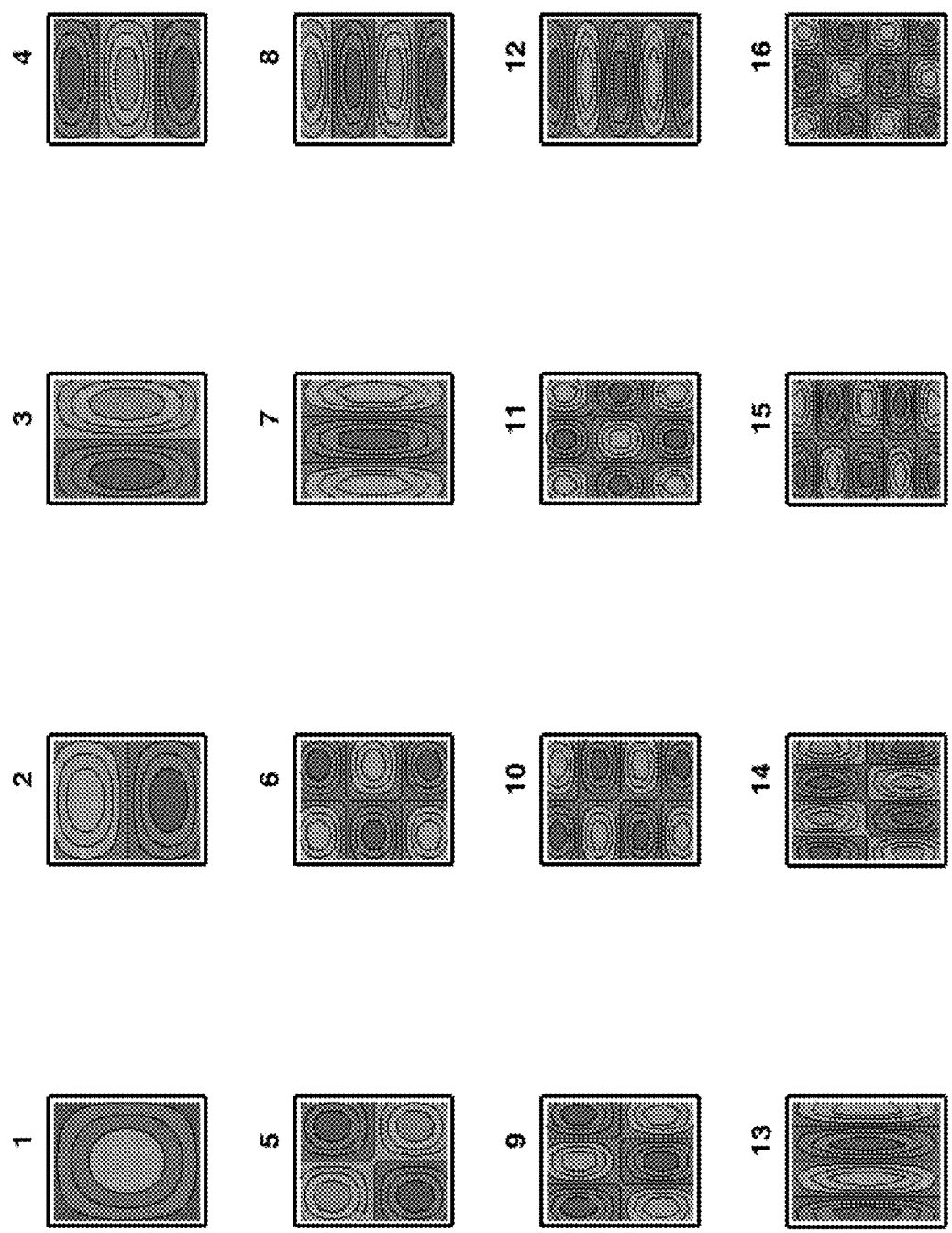
FIGS. 21a and 21b show the first 16 eigenvectors for a rectangular-shaped image segment for Dirichlet boundary conditions and Neumann boundary conditions as generated by an image processing apparatus according to an embodiment.
Figure 21B:
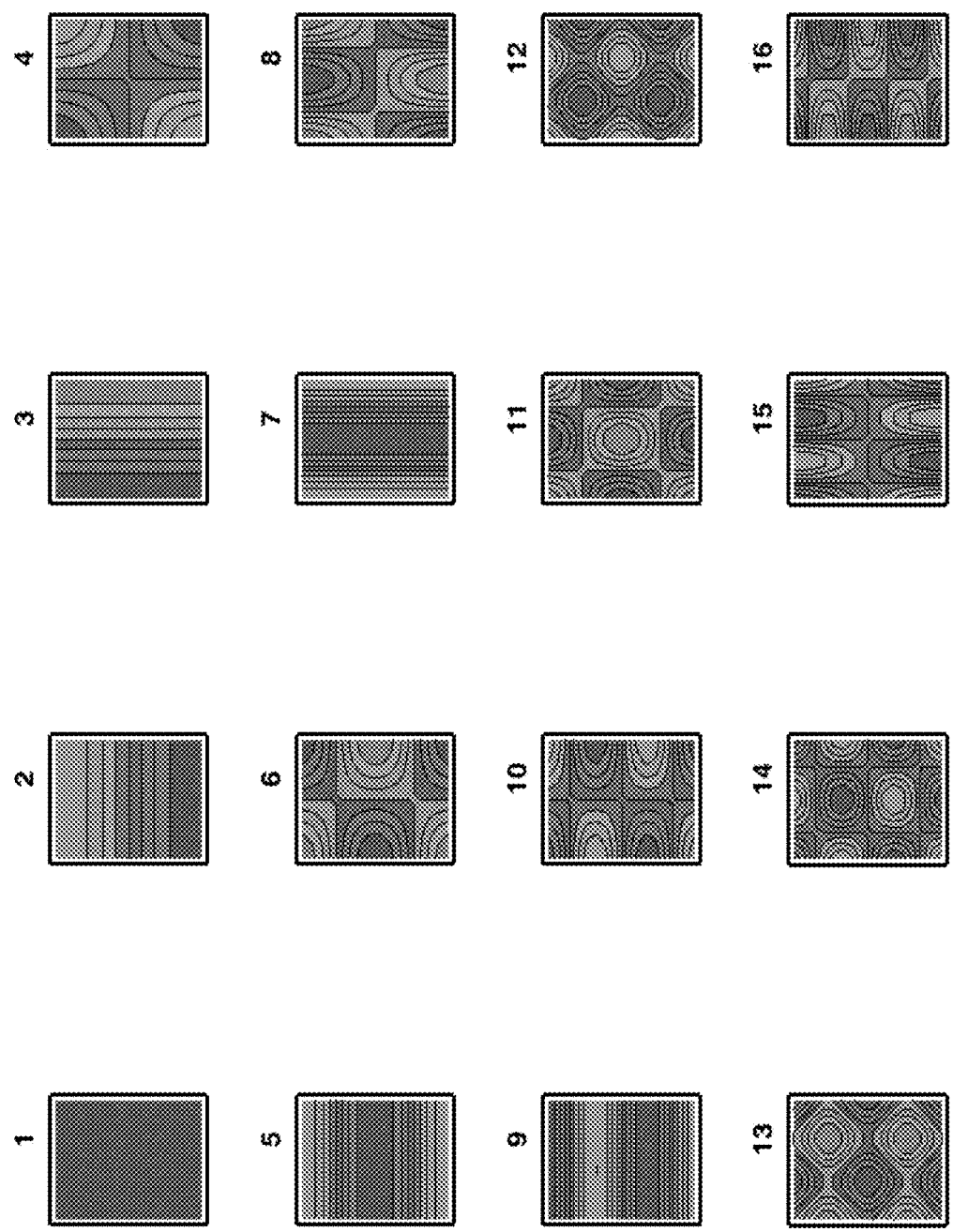
Figure 22A:
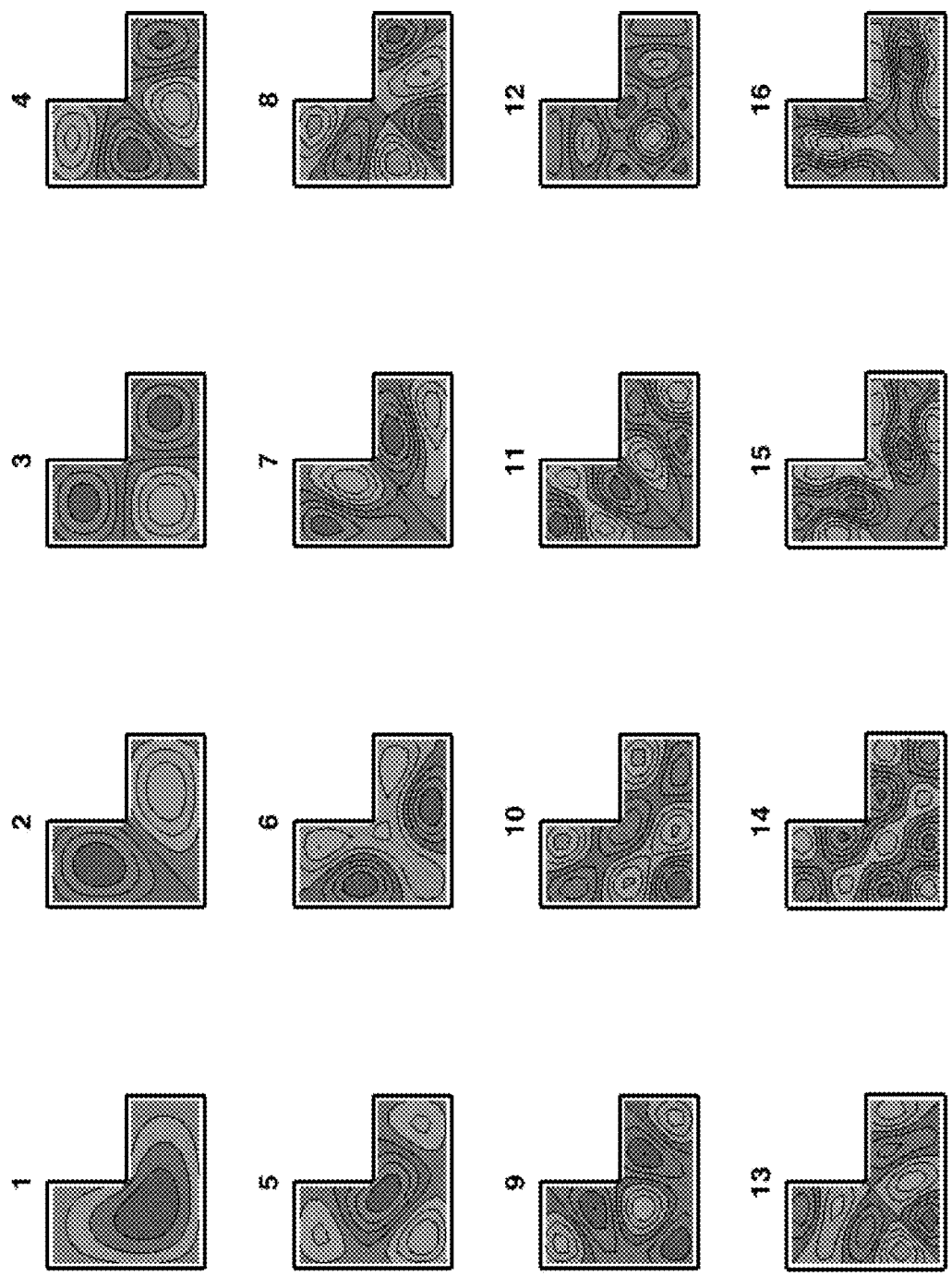
FIGS. 22a and 22b show the first 16 eigenvectors for a L-shaped image segment for Dirichlet boundary conditions and Neumann boundary conditions as generated by an image processing apparatus according to an embodiment.
Figure 22B:
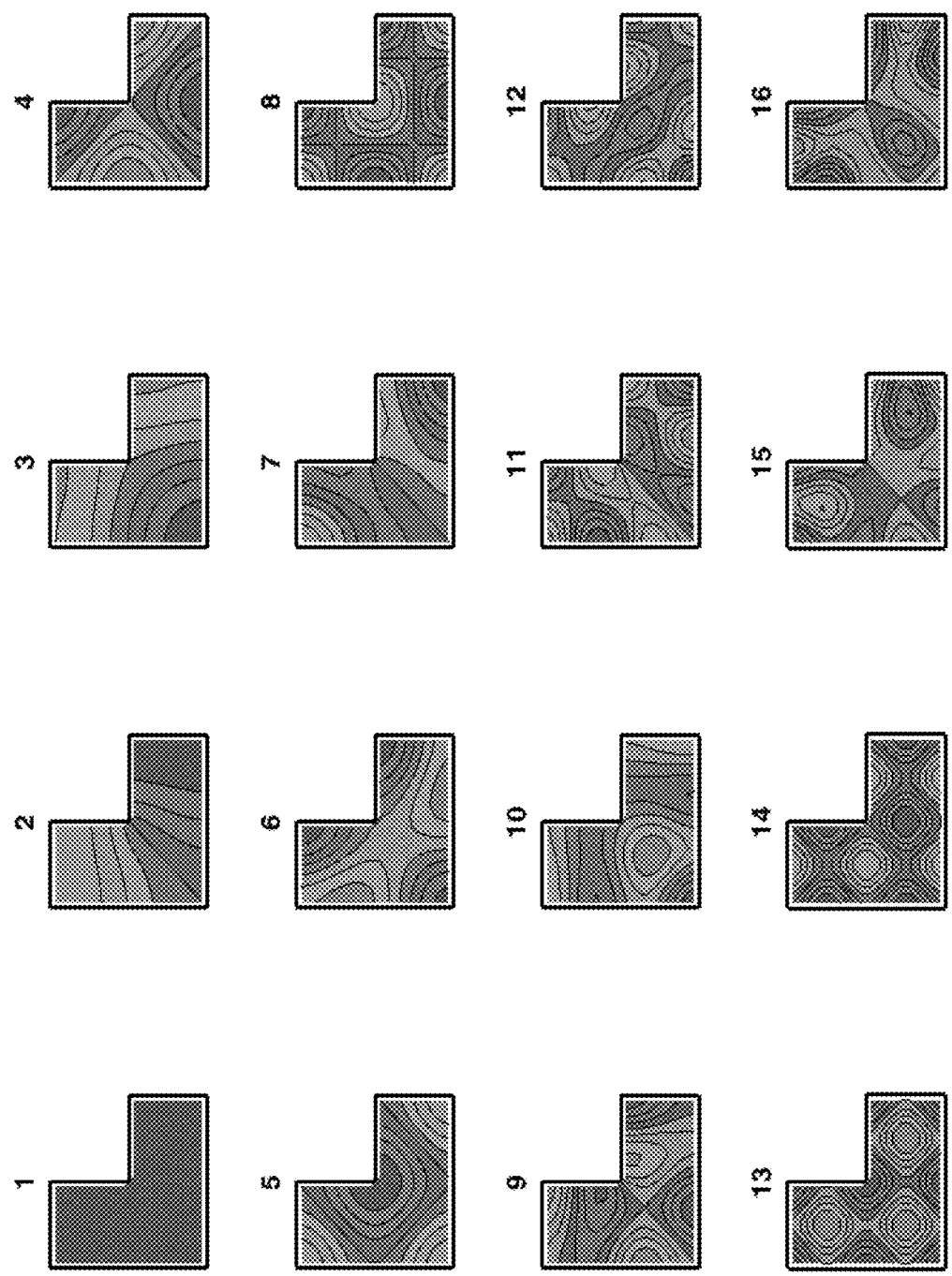
Figure 23A:
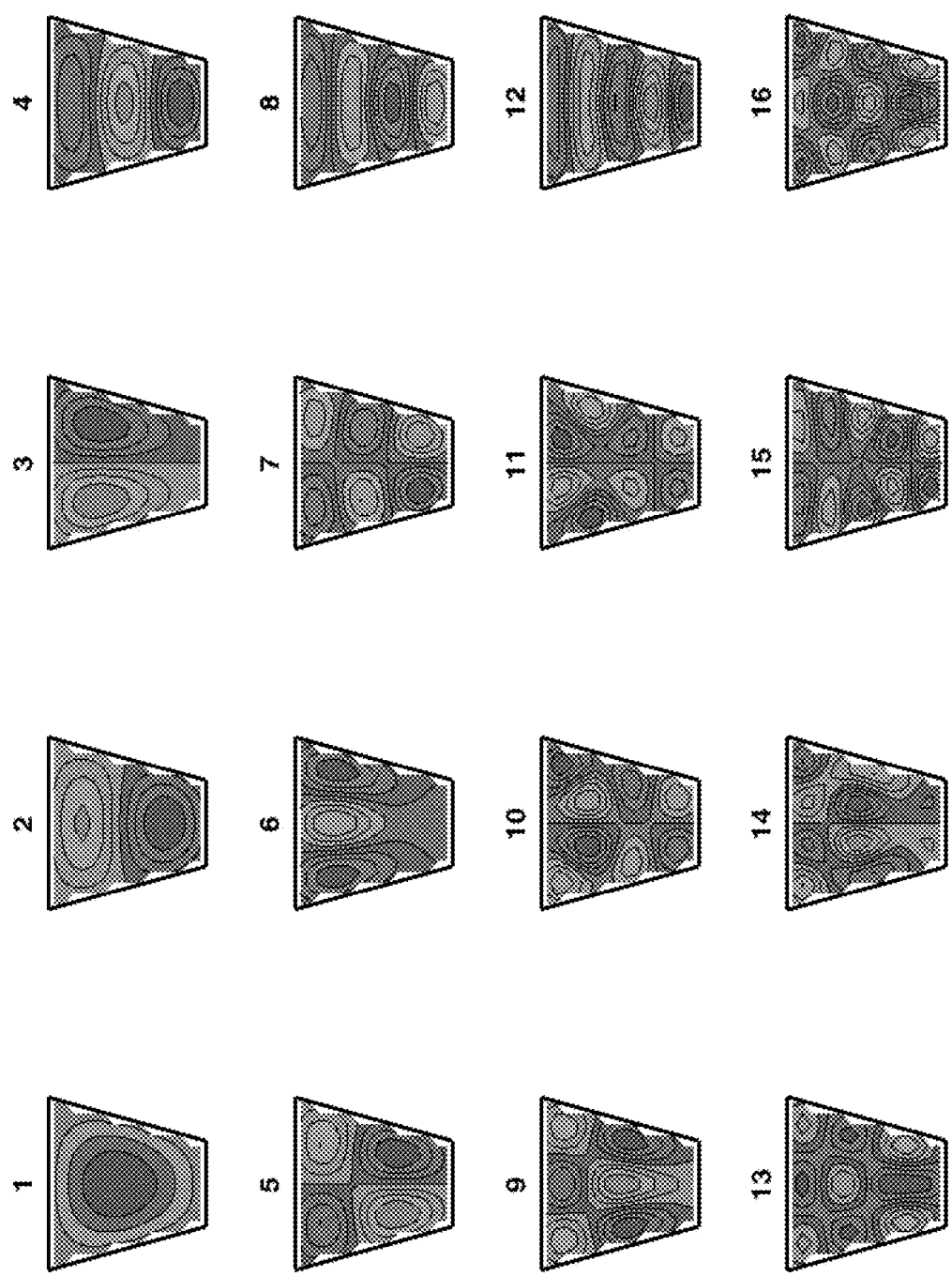
FIGS. 23a and 23b show the first 16 eigenvectors for an image segment having the shape of a trapezoid for Dirichlet boundary conditions and Neumann boundary conditions as generated by an image processing apparatus according to an embodiment.
Figure 23B:
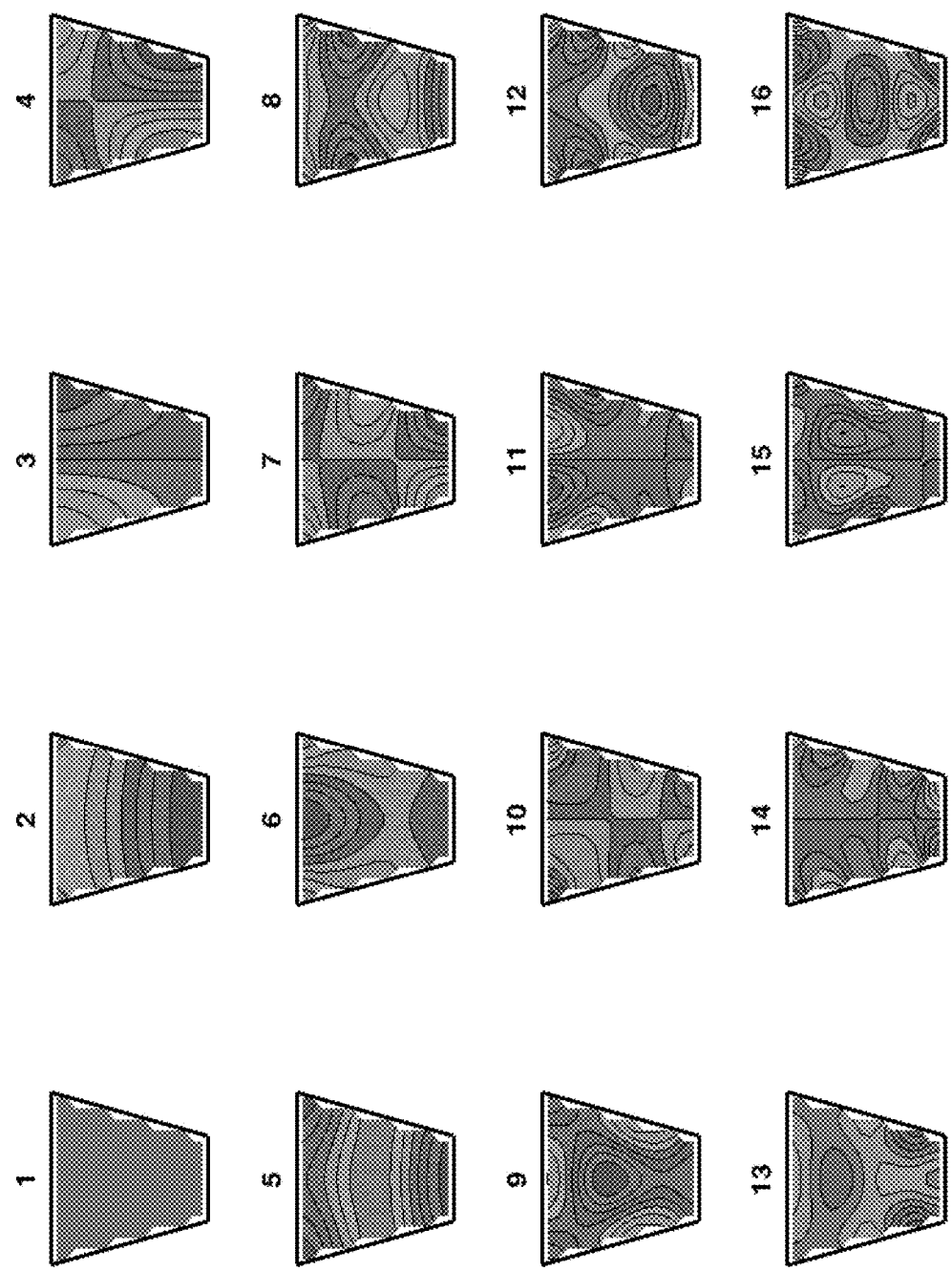
Figure 24A:
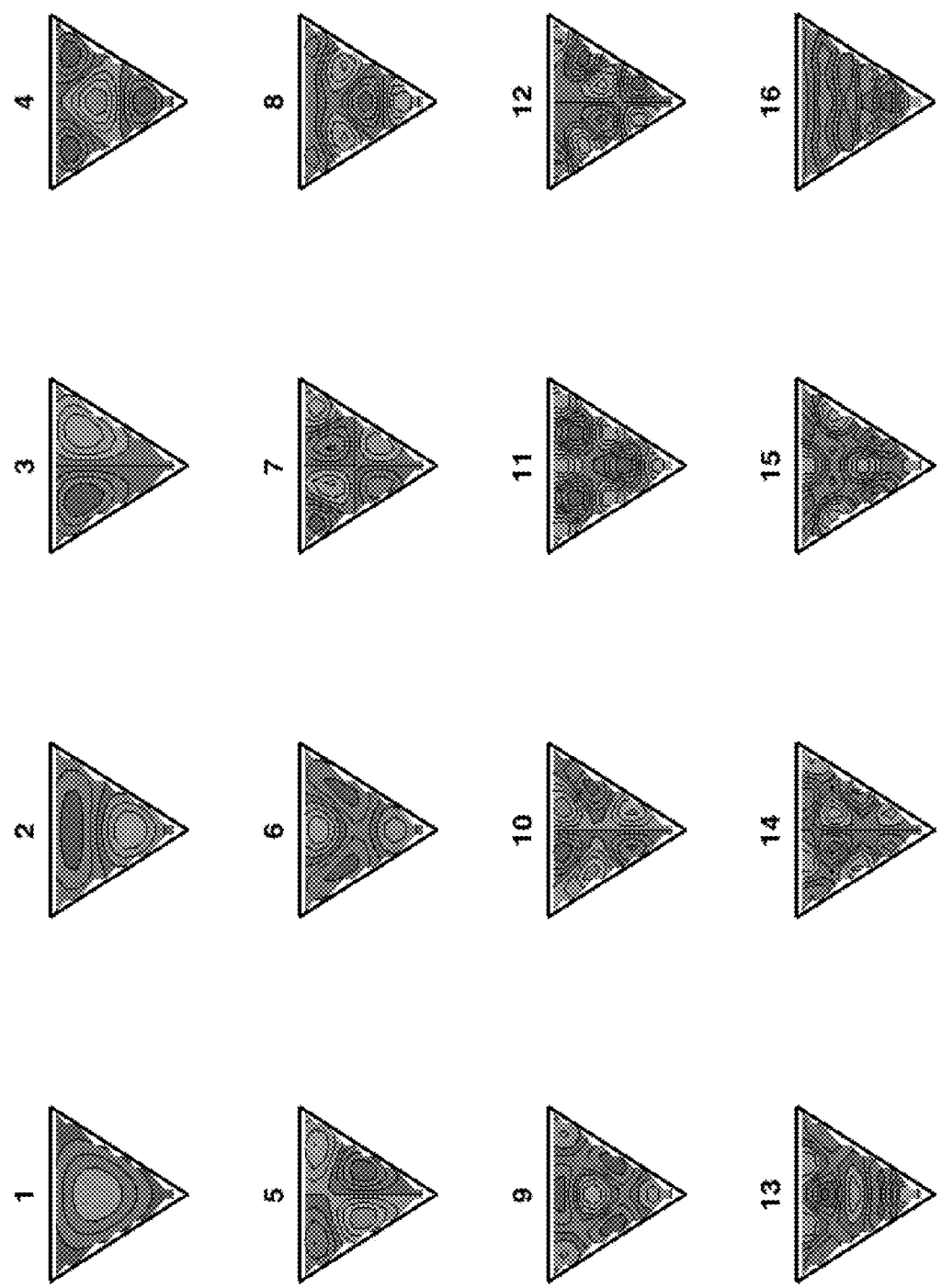
FIGS. 24a and 24b show the first 16 eigenvectors for an image segment having the shape of an equilateral triangle for Dirichlet boundary conditions and Neumann boundary conditions as generated by an image processing apparatus according to an embodiment.
Figure 24B:
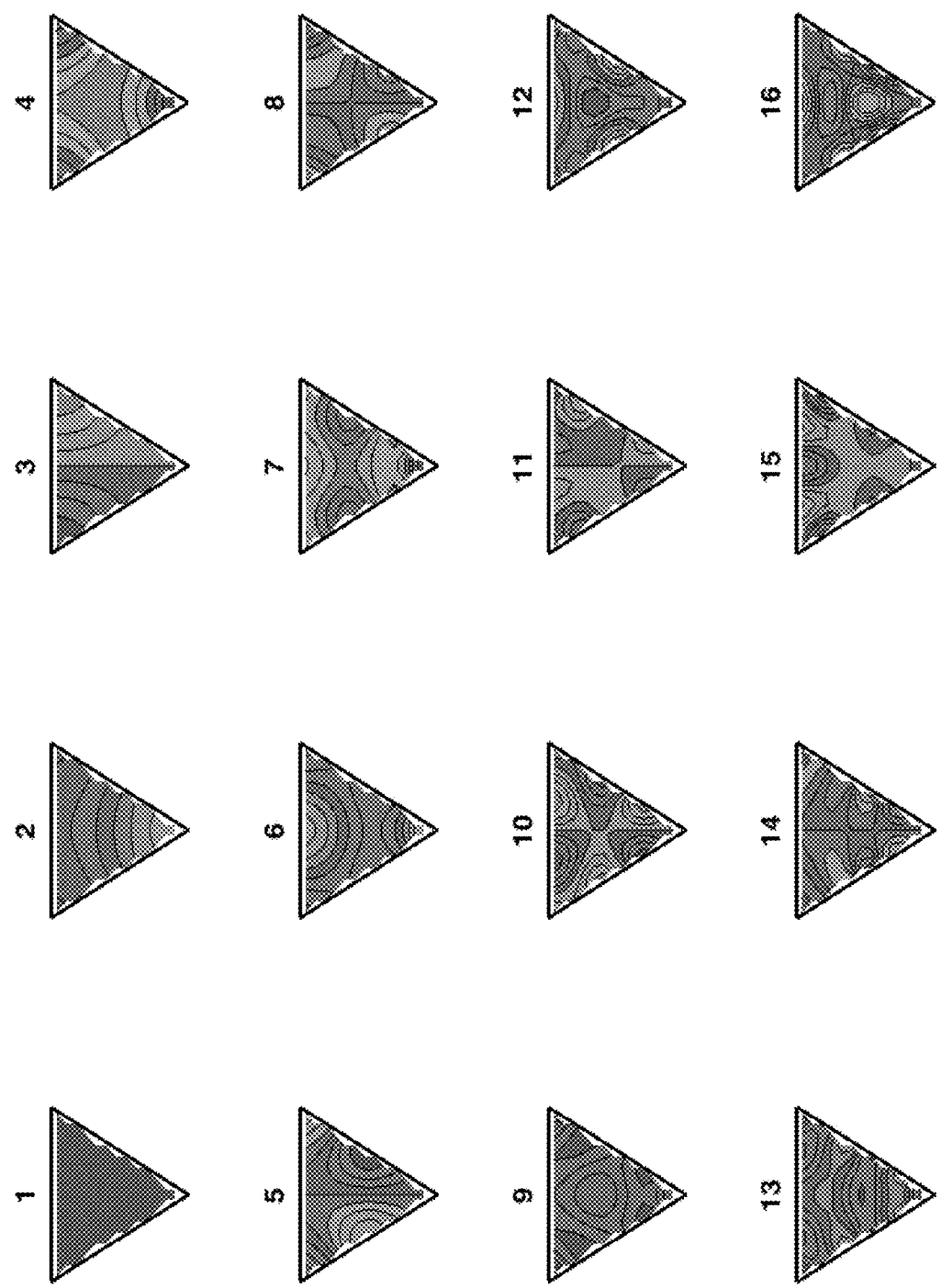
Figure 25A:
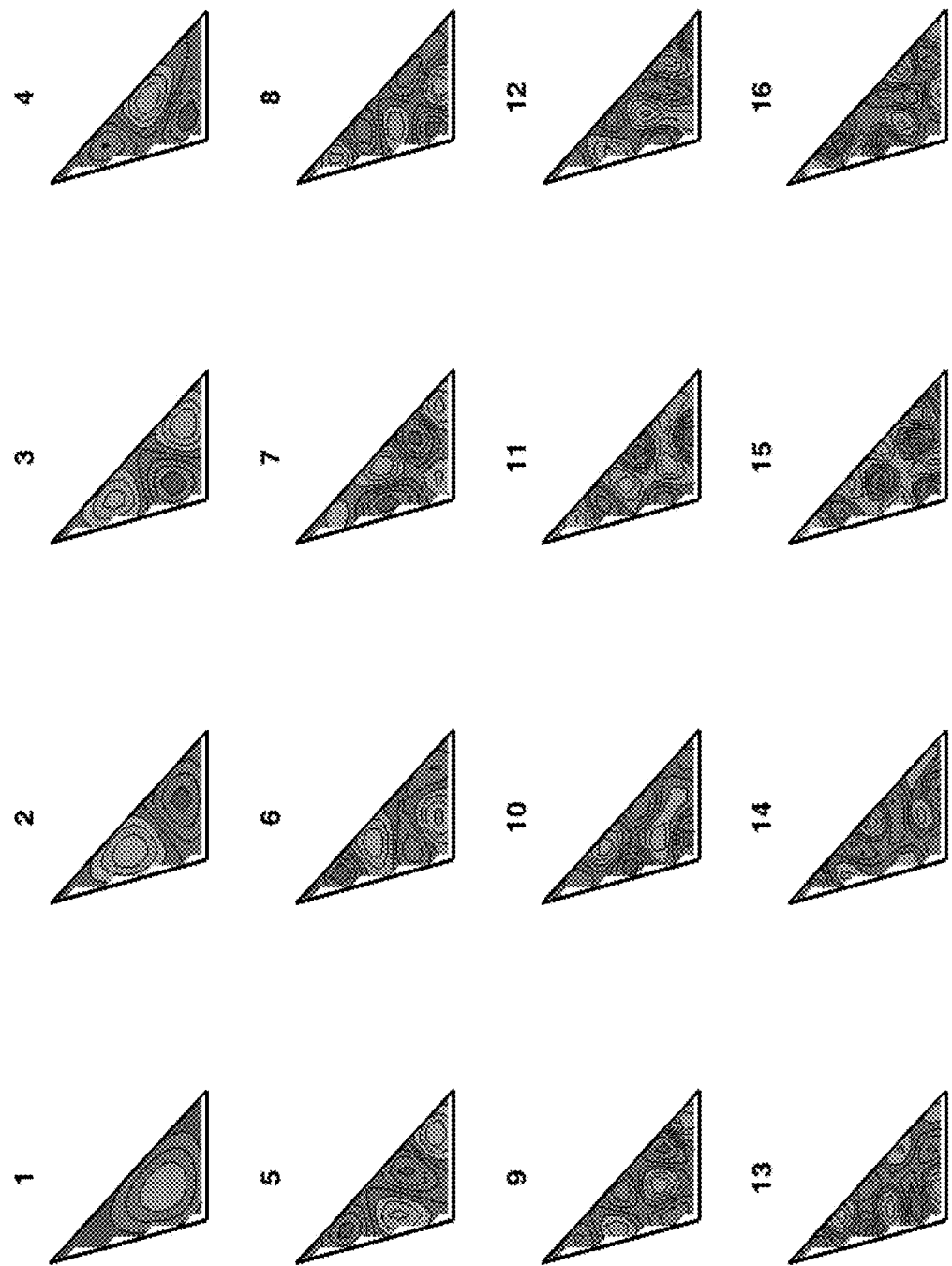
FIGS. 25a and 25b show the first 16 eigenvectors for an image segment having the shape of a general triangle for Dirichlet boundary conditions and Neumann boundary conditions as generated by an image processing apparatus according to an embodiment.
Figure 25B:
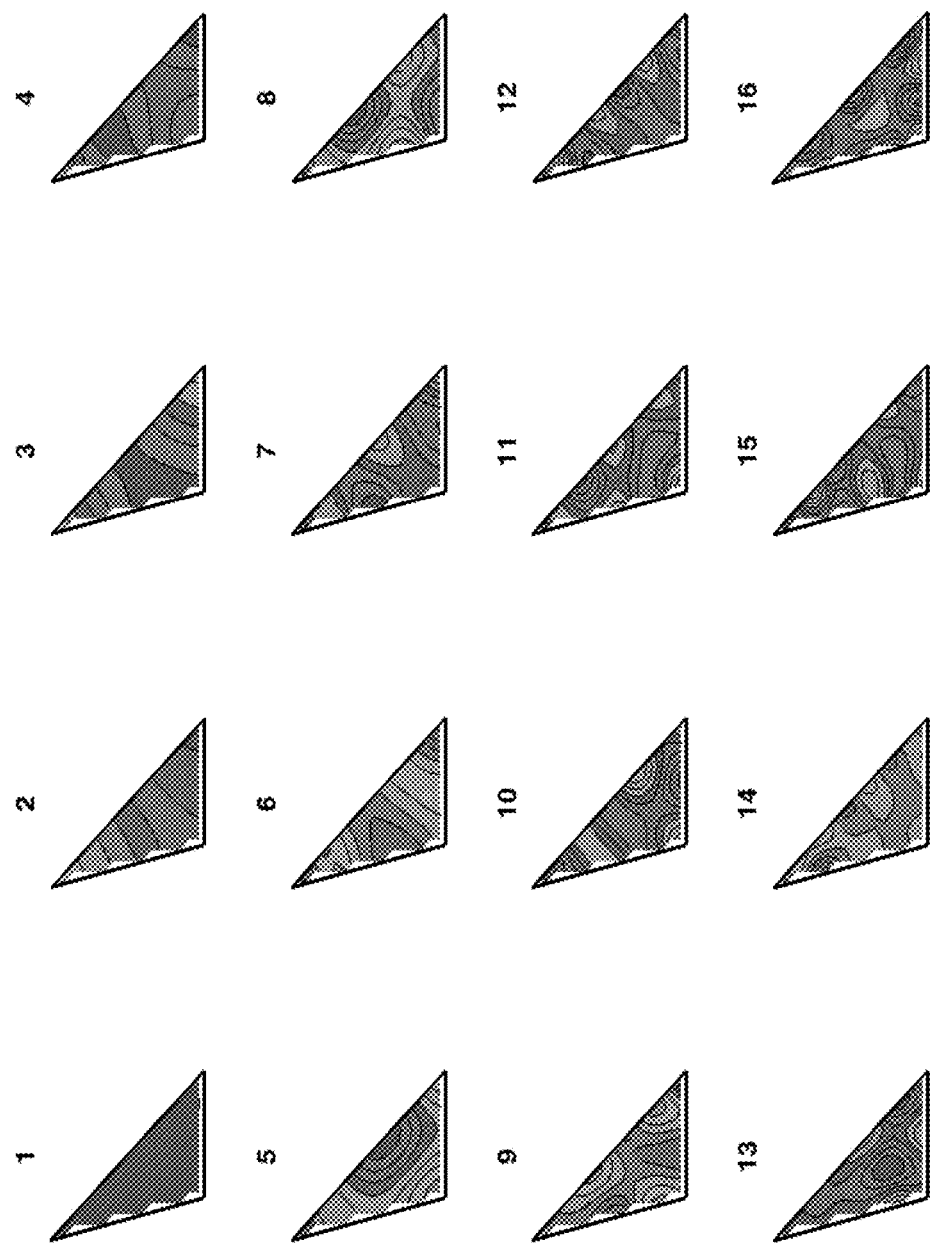

FIG. 20 shows a schematic diagram illustrating a corresponding further embodiment of the image processing apparatus 110 for decoding an image. The image decoding apparatus 110 shown in FIG. 20, which is configured to perform decoding on the basis of intra-prediction, comprises components or blocks, which are similar or identical to corresponding components or blocks of the video decoding apparatus 210 shown in FIG. 18, which is configured to perform decoding on the basis of intra-prediction as well as inter-prediction. The image decoding apparatus 110 shown in FIG. 20 differs from the video decoding apparatus 210 shown in FIG. 18 in that image decoding apparatus 110 shown in FIG. 20 does not comprise the motion compensation block 1819 as well as the corresponding selection between the intra-picture prediction block 1817 and the motion compensation block 1819 of the video decoding apparatus 210 shown in FIG. 18.

FIGS. 21a, 21b to 25a, 25b show the first 16 eigenvectors for differently shaped image segments for Dirichlet boundary conditions and Neumann boundary conditions using the 5-points stencil for the Laplacian as generated by the image processing apparatus 100, 110 according to an embodiment. Contour plots of the eigenvectors are shown at the location of the domain pixels. The eigenvectors are shown in the figure in increasing order according to the order of their corresponding eigenvectors. The first eigenvector, which corresponds to the smallest eigenvalue, has the lowest energy. As will be appreciated, for Neumann BC the first eigenvector has a constant value for all image shapes.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, the disclosure may be practiced otherwise than as specifically described herein.

What is claimed is:

1. An image processing apparatus, for compressing or decompressing, the apparatus comprising:
   a processor configured to compress or decompress a segment of an image, wherein the segment is non-rectangular and comprises a plurality of pixels, each pixel of the plurality of pixels comprises a pixel value, and the pixel values of the plurality of pixels form a pixel value vector,
   wherein compressing the segment comprises computing a plurality of expansion coefficients by expanding the pixel value vector into a plurality of basis vectors, wherein the basis vectors are discrete approximations of solutions of a boundary value problem of the Helmholtz equation on the segment of the image; and
   wherein decompressing the segment comprises computing the pixel value vector by forming a linear combination of the basis vectors according to the plurality of expansion coefficients.

2. The image processing apparatus of claim 1, wherein a discretized Laplace operator of the Helmholtz equation is represented as a system matrix A, and the processor is further configured to determine the basis vectors as eigenvectors of the system matrix A.

3. The image processing apparatus of claim 2, wherein the processor is configured to generate the system matrix A based on a shape of the segment.

4. The image processing apparatus of claim 2, wherein the processor is configured to generate the system matrix A based on a plurality of boundary conditions defined for a boundary of the segment.

5. The image processing apparatus of claim 2, wherein the processor is configured to define the discretized Laplace operator as a five-point stencil or a nine-point stencil.

6. The image processing apparatus of claim 2, wherein the processor is configured to generate the system matrix A by scanning the plurality of pixels of the segment based on a scanning order to define an order of the plurality of pixels of the segment and to determine the number of the plurality of pixels of the segment, wherein the number of the plurality of pixels of the segment defines the size K×K of the system matrix A.

7. The image processing apparatus of claim 6, wherein the processor is configured to generate an i-th column of the system matrix A by centering the discretized Laplace operator on the i-th pixel of the plurality of pixels as defined by the scanning order.

8. The image processing apparatus of claim 7, wherein the processor is configured to define the i-th column of the system matrix A based on the plurality of boundary conditions, wherein the plurality of boundary conditions comprise Dirichlet boundary conditions, Neumann boundary conditions and/or mixed boundary conditions.

9. The image processing apparatus of claim 2, wherein the processor is further configured to determine eigenvalues of the system matrix A and to arrange the eigenvectors of the system matrix A in increasing order.

10. The image processing apparatus of claim 2, wherein the image processing apparatus comprises a video coding apparatus, wherein the video coding apparatus is configured during encoding for compressing a non-rectangular segment of a residual image generated from a video signal or configured during decoding for decompressing a non-rectangular segment of a residual image generated from the video signal.

11. The image processing apparatus of claim 10, wherein the eigenvectors of the system matrix A define a transformation matrix V, and wherein for encoding or decoding the video signal, the processor is configured to scan the column vectors of the transformation matrix V according to an increasing order of eigenvalues associated with the eigenvectors of the system matrix A.

12. The image processing apparatus of claim 10, wherein the processor is further configured to determine the orthogonal set of transforms based on a rate distortion criterion.

13. The image processing apparatus of claim 10, wherein the processor is further configured to determine the plurality of boundary conditions for the plurality of boundary pixels of the segment based on another image segment of the same image or a different image of the video signal.

14. An image processing method for compressing or decompressing a segment of an image, the method comprising:
  compressing or decompressing the segment of the image, wherein the segment is non-rectangular and comprises a plurality of pixels, each pixel of the plurality of pixels comprises a pixel value, and the pixel values of the plurality of pixels form a pixel value vector,
  wherein compressing the segment comprises computing a plurality of expansion coefficients by expanding the pixel value vector into a plurality of basis vectors, wherein the basis vectors are discrete approximations of solutions of a boundary value problem of the Helmholtz equation on the segment of the image, and
  wherein decompressing the segment comprises computing the pixel value vector by forming a linear combination of the basis vectors according to the plurality of expansion coefficients.

15. The method of claim 14, wherein a discretized Laplace operator of the Helmholtz equation is represented as a system matrix A, the method further comprising:
  determining the basis vectors as eigenvectors of the system matrix A.

16. The method of claim 15, further comprising:
  generating the system matrix A by scanning the plurality of pixels of the segment based on a scanning order to define an order of the plurality of pixels of the segment and to determine the number of the plurality of pixels of the segment, wherein the number of the plurality of pixels of the segment defines the size K×K of the system matrix A.

17. A non-transitory storage medium comprising program code that, when executed by a computer, causes the computer to perform an image processing method for compressing or decompressing a segment of an image, by performing the steps of:
  compressing or decompressing the segment of the image, wherein the segment is non-rectangular and comprises a plurality of pixels, each pixel of the plurality of pixels comprises a pixel value, and the pixel values of the plurality of pixels form a pixel value vector,
  wherein compressing the segment comprises computing a plurality of expansion coefficients by expanding the pixel value vector into a plurality of basis vectors, wherein the basis vectors are discrete approximations of solutions of a boundary value problem of the Helmholtz equation on the segment of the image, and
  wherein decompressing the segment comprises computing the pixel value vector by forming a linear combination of the basis vectors according to the plurality of expansion coefficients.

18. The non-transitory storage medium of claim 17, wherein a discretized Laplace operator of the Helmholtz equation is represented as a system matrix A, the steps further comprising:
  determining the basis vectors as eigenvectors of the system matrix A.

19. The non-transitory storage medium of claim 18, the steps further comprising:
  generating the system matrix A by scanning the plurality of pixels of the segment based on a scanning order to define an order of the plurality of pixels of the segment and to determine the number of the plurality of pixels of the segment, wherein the number of the plurality of pixels of the segment defines the size K×K of the system matrix A.

20. The non-transitory storage medium of claim 18, the steps further comprising:
  generating an i-th column of the system matrix A by centering the discretized Laplace operator on the i-th pixel of the plurality of pixels as defined by the scanning order.

* * * * *